United States Patent
Mossberg et al.

(10) Patent No.: US 10,386,553 B2
(45) Date of Patent: Aug. 20, 2019

(54) PARTIALLY ETCHED PHASE-TRANSFORMING OPTICAL ELEMENT

(71) Applicant: Finisar Corporation, Sunnyvale, CA (US)

(72) Inventors: Thomas W. Mossberg, Eugene, OR (US); Christoph M. Greiner, Eugene, OR (US); Dmitri Iazikov, Eugene, OR (US)

(73) Assignee: FINISAR CORPORATION, Sunnyvale, CA (US)

( * ) Notice: Subject to any disclaimer, the term of this patent is extended or adjusted under 35 U.S.C. 154(b) by 36 days.

(21) Appl. No.: 15/442,711

(22) Filed: Feb. 27, 2017

(65) Prior Publication Data

US 2017/0168202 A1 Jun. 15, 2017

Related U.S. Application Data

(63) Continuation of application No. 14/687,882, filed on Apr. 15, 2015, now Pat. No. 9,618,664.

(51) Int. Cl.
*G02B 5/18* (2006.01)

(52) U.S. Cl.
CPC ......... *G02B 5/1866* (2013.01); *G02B 5/1861* (2013.01); *G02B 5/1871* (2013.01)

(58) Field of Classification Search
CPC .............. G02B 26/06; G02B 26/02076–02209
USPC ......................................... 359/573, 577, 586
See application file for complete search history.

(56) References Cited

U.S. PATENT DOCUMENTS

| | | | |
|---|---|---|---|
| 5,330,862 A | | 7/1994 | Tabuchi et al. |
| 5,480,047 A | * | 1/1996 | Tanigawa ................ G03F 1/26 216/24 |
| 5,840,447 A | | 11/1998 | Peng |
| 5,928,813 A | | 7/1999 | Krivokapic et al. |
| 6,197,456 B1 | * | 3/2001 | Aleshin ................... G03F 1/28 430/5 |
| 6,545,808 B1 | | 4/2003 | Ehbets et al. |
| 6,599,666 B2 | | 7/2003 | Rolfson |
| 6,977,127 B2 | | 12/2005 | Shiah et al. |
| 6,985,656 B2 | | 1/2006 | Iazikov et al. |
| 6,987,911 B2 | | 1/2006 | Mossberg et al. |
| 7,057,819 B1 | | 6/2006 | Maheshwari |

(Continued)

FOREIGN PATENT DOCUMENTS

| | | |
|---|---|---|
| EP | 1 486 803 A2 | 12/2004 |
| JP | 2001-108812 | 4/2001 |

(Continued)

OTHER PUBLICATIONS

Iazikov et al; U.S. Appl. No. 15/784,702, filed Oct. 18, 2017.
Search Report and Written Opinion dated Jul. 20, 2016 in counterpart international App No. PCT/US2016/026835.

*Primary Examiner* — Collin X Beatty
(74) *Attorney, Agent, or Firm* — David S. Alavi

(57) ABSTRACT

An optical element (transmissive or reflective) includes a transmissive layer comprising two different optical media arranged among discrete volumes arranged along the layer. The discrete volumes are arranged to approximate a desired phase function (typically modulo 2π) and are smaller than an operational wavelength in order to provide a range of phase delays needed to adequately approximate the desired phase function.

43 Claims, 14 Drawing Sheets

(56) References Cited

U.S. PATENT DOCUMENTS

| | | |
|---|---|---|
| 7,173,767 B2 | 2/2007 | Satzke |
| 7,260,290 B1 | 8/2007 | Greiner et al. |
| RE39,865 E | 10/2007 | Hill et al. |
| 7,663,084 B2 | 2/2010 | Toshikiyo et al. |
| 7,692,129 B2 | 4/2010 | Toshikiyo et al. |
| 8,009,355 B2 | 8/2011 | Nakai |
| 8,178,010 B2 | 5/2012 | Hirai et al. |
| 8,559,110 B2 | 10/2013 | Tanikawa |
| 8,755,118 B2 | 6/2014 | Chang-Hasnain et al. |
| 8,765,360 B2 | 7/2014 | Wang et al. |
| 9,618,664 B2 | 4/2017 | Mossberg et al. |
| 2004/0218270 A1 | 11/2004 | Wang |
| 2005/0045799 A1 | 3/2005 | Deng et al. |
| 2005/0226122 A1 | 10/2005 | Ooi et al. |
| 2005/0277063 A1 | 12/2005 | Wang et al. |
| 2006/0049056 A1 | 3/2006 | Wang et al. |
| 2006/0127829 A1 | 6/2006 | Deng et al. |
| 2007/0103782 A1 | 5/2007 | Lee et al. |
| 2009/0041971 A1 | 2/2009 | Wang et al. |
| 2009/0053655 A1 | 2/2009 | Deng et al. |
| 2009/0116790 A1 | 5/2009 | Mossberg et al. |
| 2012/0002286 A1 | 1/2012 | Tanikawa |
| 2012/0105962 A1 | 5/2012 | Fattal et al. |
| 2013/0137016 A1 | 5/2013 | Li et al. |
| 2014/0002911 A1 | 1/2014 | Peloux et al. |
| 2015/0090862 A1 | 4/2015 | Matsui et al. |

FOREIGN PATENT DOCUMENTS

| | | |
|---|---|---|
| JP | 2001-318217 | 11/2001 |
| JP | 3308021 B2 | 7/2002 |
| JP | 2004-061905 | 2/2004 |
| JP | 3547665 B2 | 7/2004 |
| JP | 2005-266188 | 9/2005 |
| JP | 2006-011121 A | 1/2006 |
| JP | 2008-258367 | 10/2008 |
| JP | 4508278 B2 | 7/2010 |
| JP | 2011-040441 | 2/2011 |
| JP | 2012-014067 | 1/2012 |

* cited by examiner

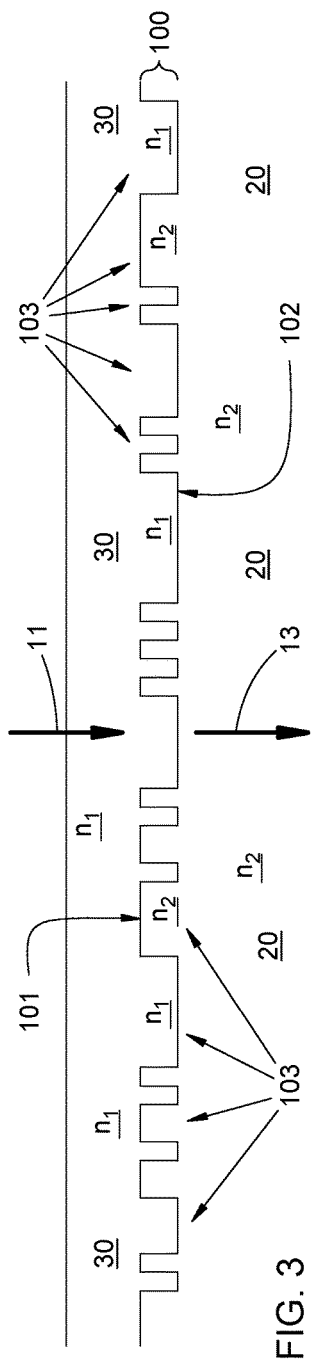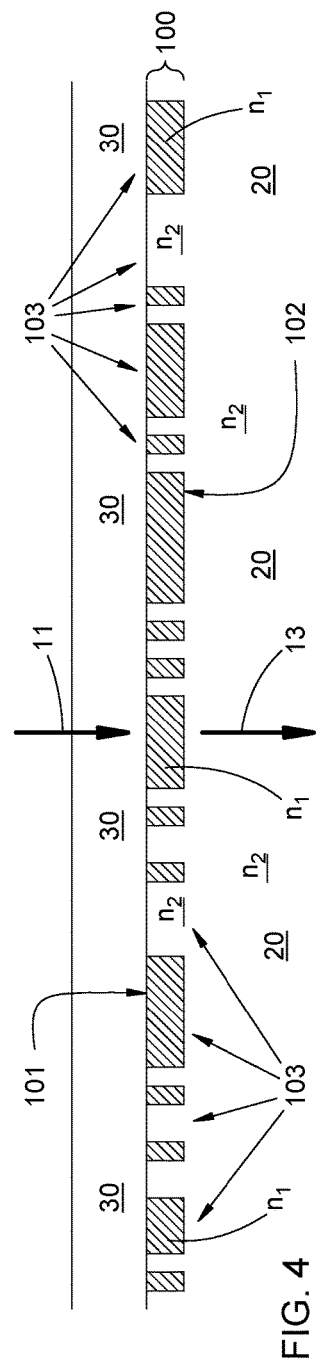

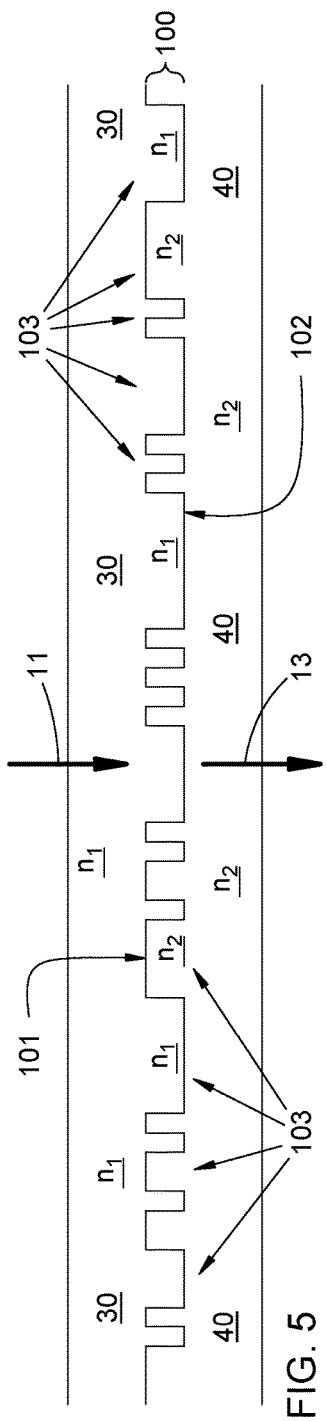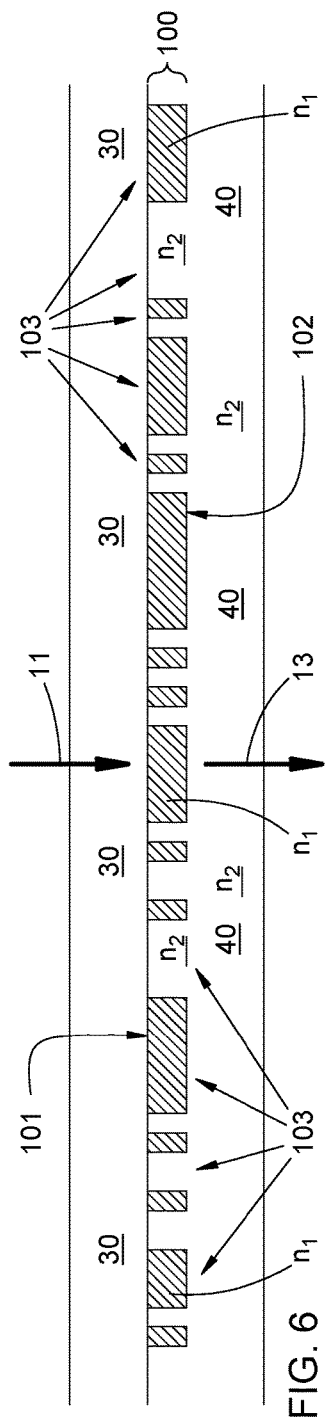

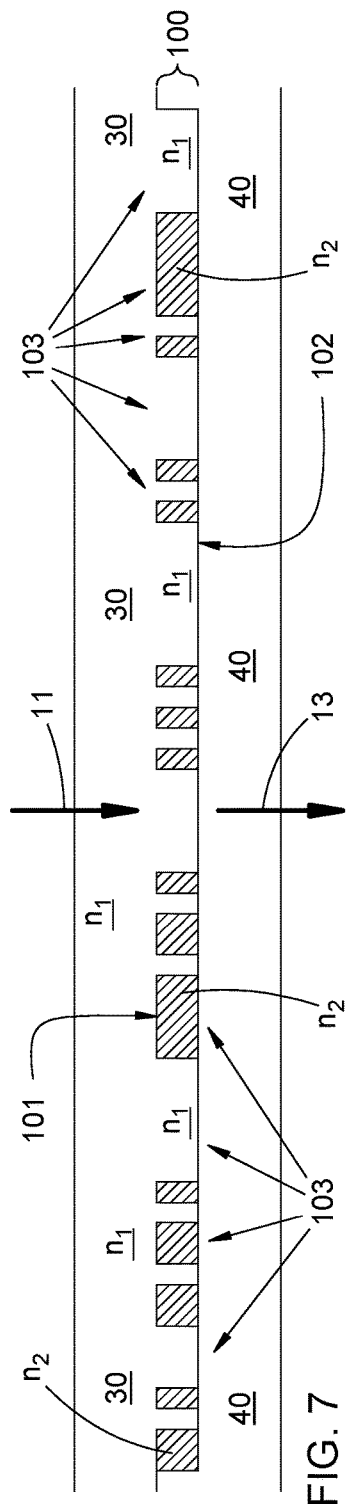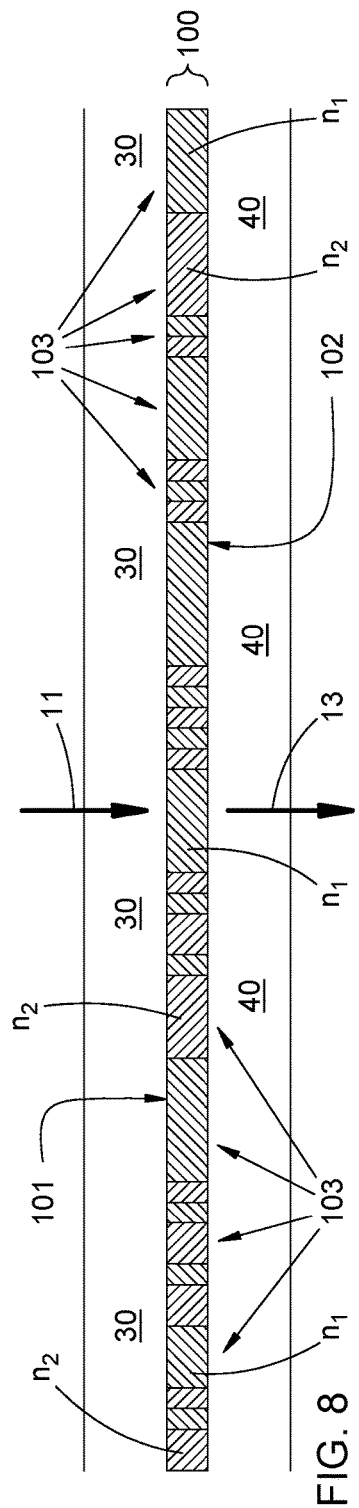

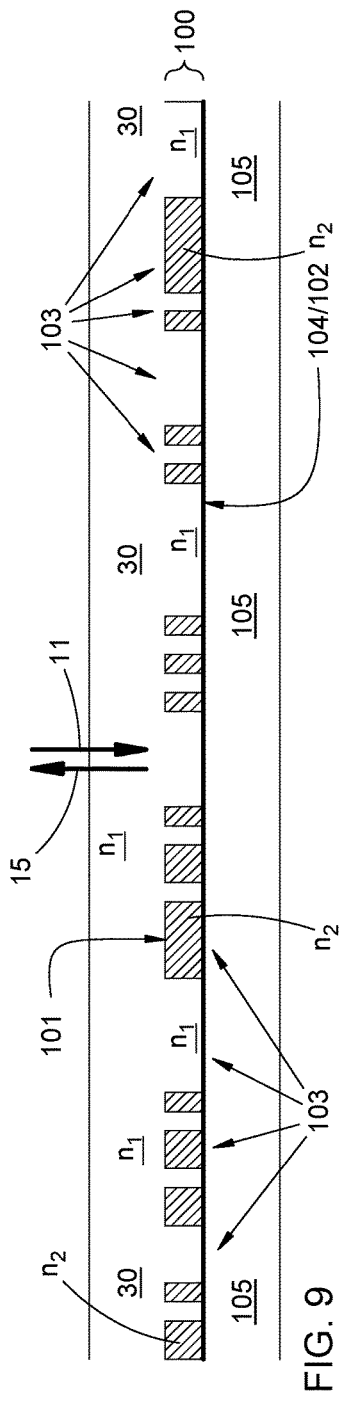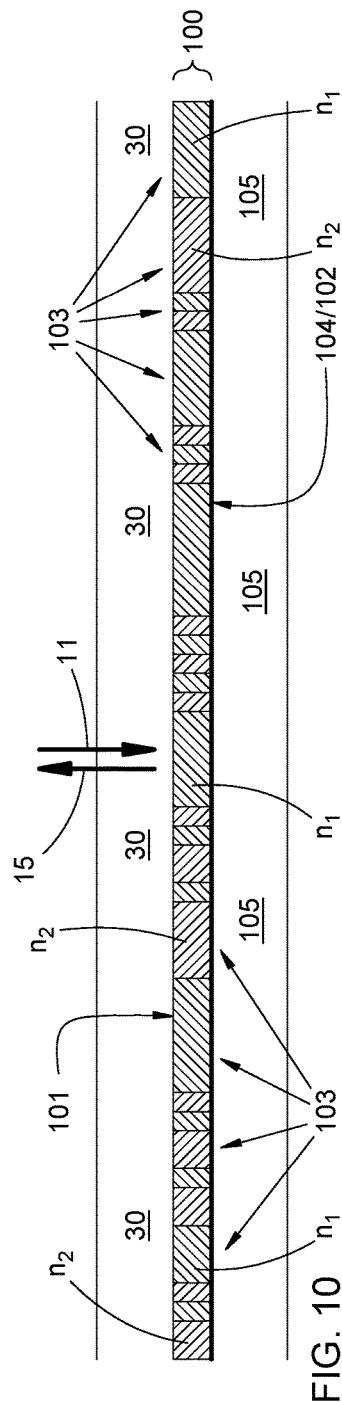

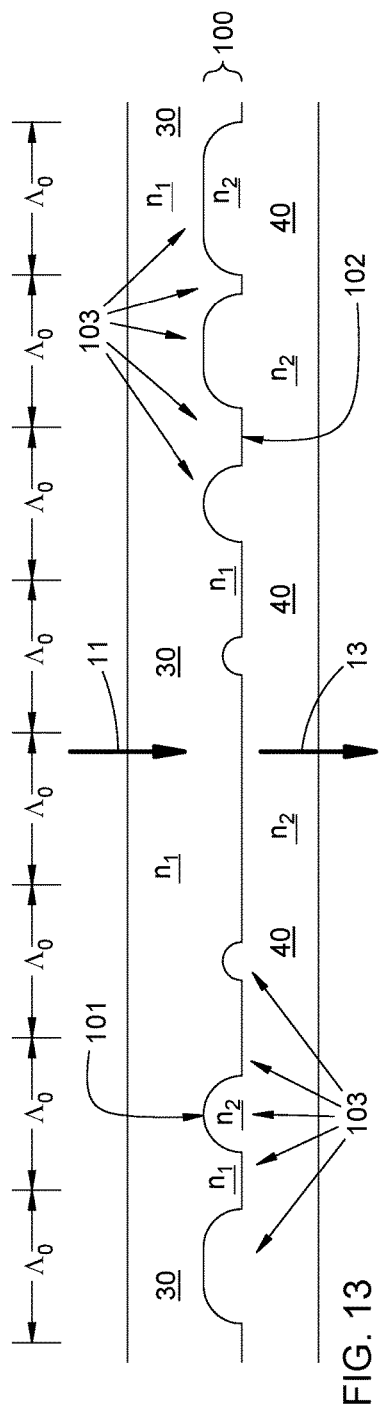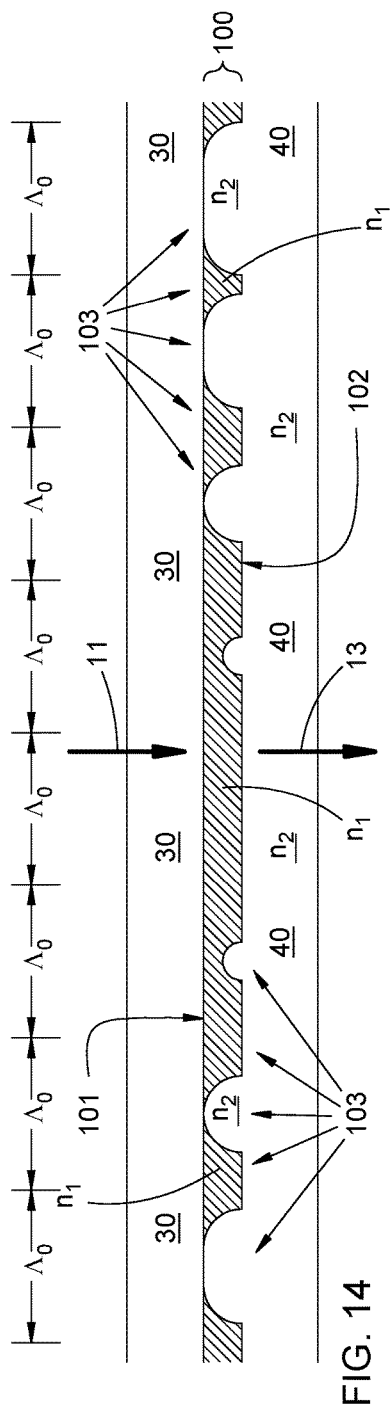

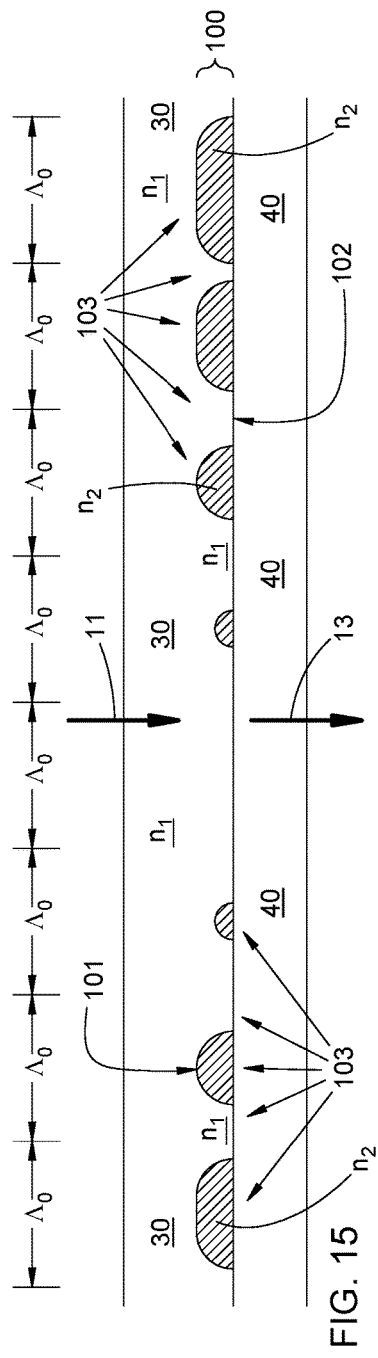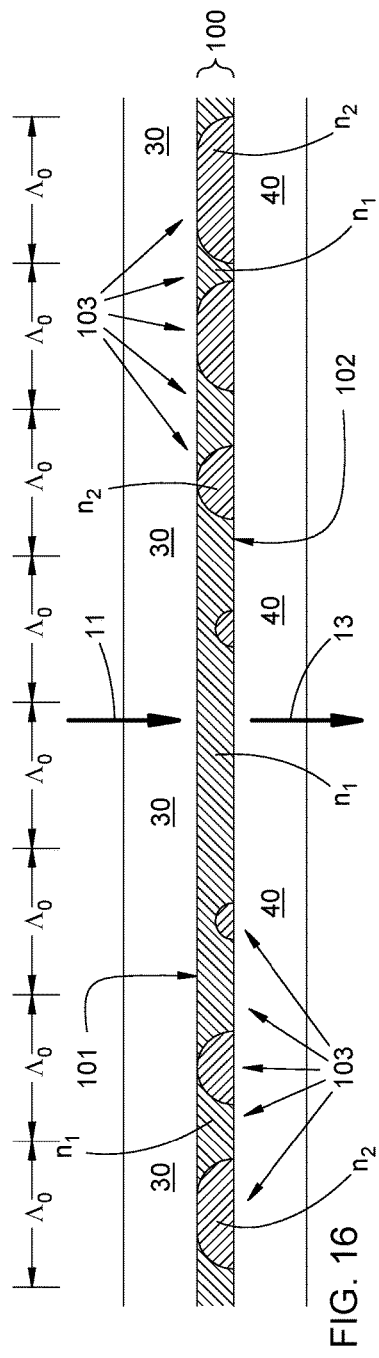

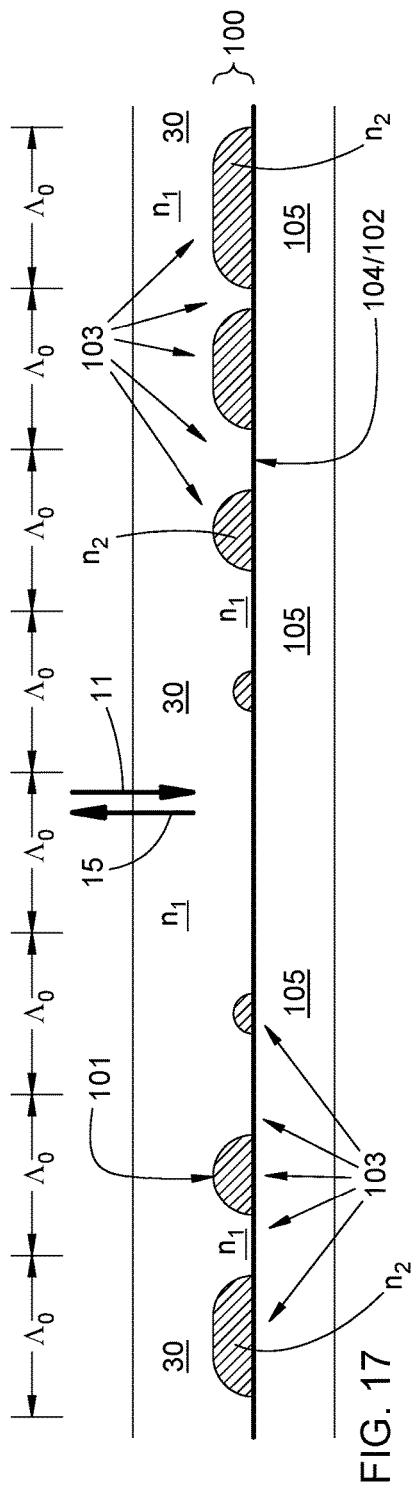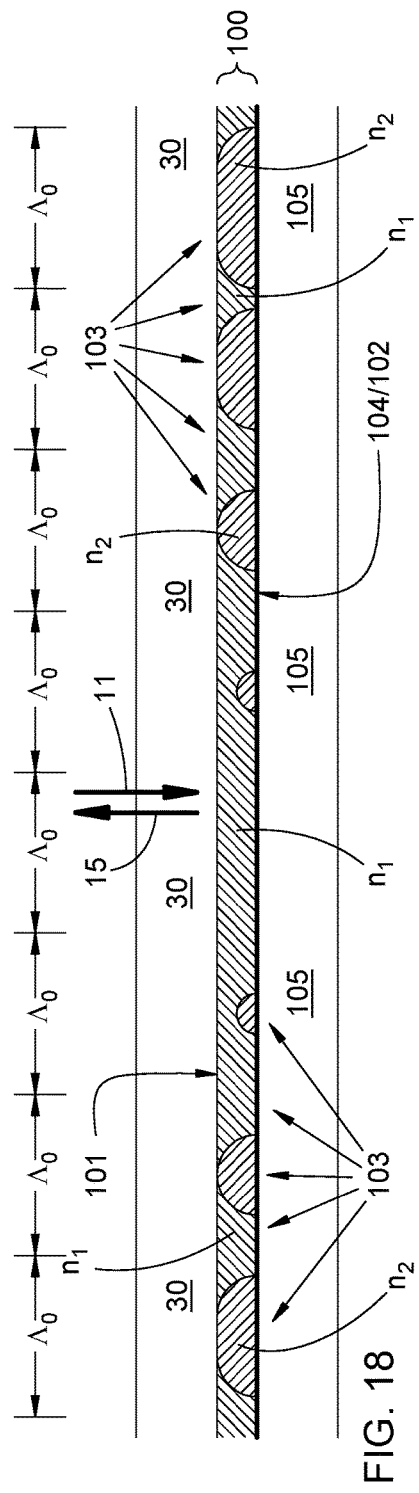

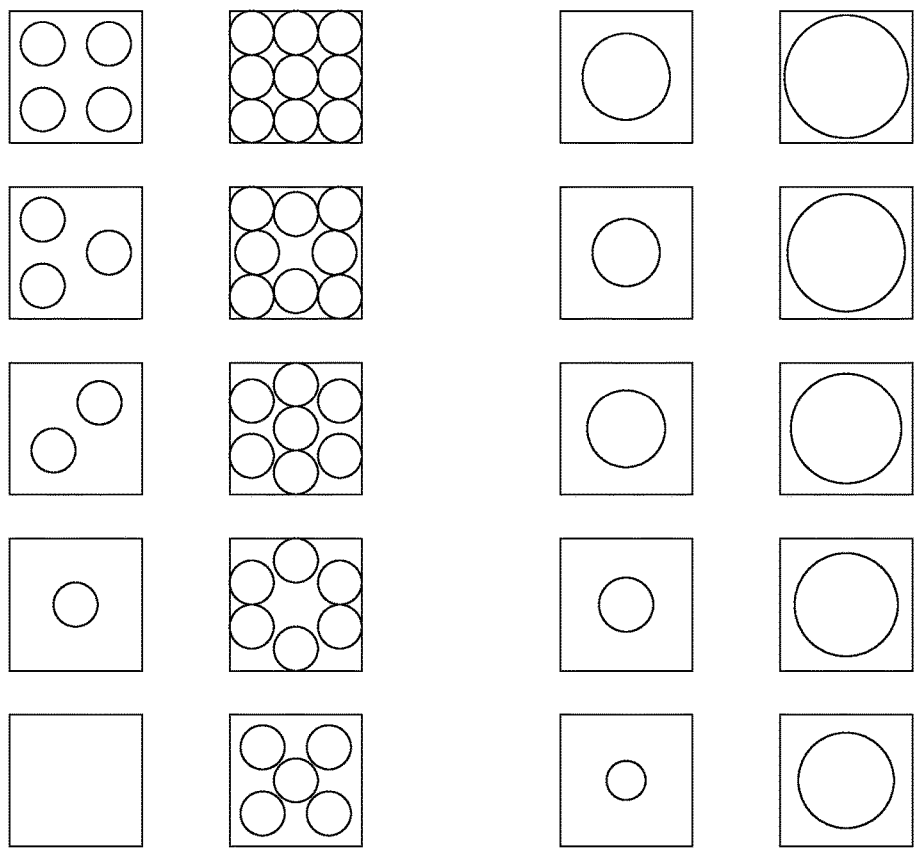

US 10,386,553 B2

PARTIALLY ETCHED PHASE-TRANSFORMING OPTICAL ELEMENT

This application is a continuation of U.S. non-provisional application Ser. No. 14/687,882 filed Apr. 15, 2015 in the names of Thomas W. Mossberg, Christoph M. Greiner, and Dmitri Iazikov, said application being hereby incorporated by reference as if fully set forth herein.

FIELD OF THE INVENTION

The field of the present invention relates to phase-transforming optical elements. In particular, optical elements, and methods for making and using the same, are disclosed herein that employ position-dependent phase transformation of a transmitted or reflected optical signal.

SUMMARY

An inventive optical element comprising a transmissive layer comprising first and second optical media. The first and second optical media are substantially transparent over an operational wavelength range including a design vacuum wavelength $\lambda_0$ and are characterized by differing respective first and second wavelength-dependent bulk refractive indices $n_1(\lambda)$ and $n_2(\lambda)$. The first optical medium comprises a substantially solid material. The first and second optical media are arranged within the layer as a contiguous multitude of discrete volumes, including a non-empty subset of volumes of the multitude having a largest transverse dimension less than about $\lambda_0$, wherein each discrete volume comprises either the first optical medium or the second optical medium, but not both. The optical element is structurally arranged so as to receive an optical signal, within the operational wavelength range, incident on the first surface within the transmission region and to transmit or reflect at least a portion of the incident optical signal transformed substantially according to the effective phase transformation function $\varphi_{\text{eff}}(x,y)$ that varies as a function of two-dimensional position coordinates x and y along the first surface. The discrete volumes of the multitude are variously sized and distributed on the transmissive layer so as to impart on the transmitted or reflected portion of the incident optical signal the effective phase transformation $\varphi_{\text{eff}}(x,y)$.

A method employing the inventive optical element comprises (i) directing an optical signal onto the first surface of the transmissive layer of the optical element and (ii) transmitting through or reflecting from the optical element at least a portion of the optical signal transformed substantially according to the effective phase transformation function $\varphi_{\text{eff}}(x,y)$. A method for making the inventive optical element comprises spatially selectively processing a layer comprising the first optical medium to replace, in selected volumes of the layer, the first optical medium with the second optical medium, thereby forming the transmissive layer of the optical element.

Objects and advantages pertaining to phase-transforming optical elements may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3-8 and 11-16 illustrate schematically various examples of a transmissive optical element.

FIGS. 9, 10, 17, and 18 illustrate schematically various examples of a reflective optical element.

FIGS. 19 and 20 illustrate schematically two example unit cell arrangements for the transmissive layer.

Figure 1A:
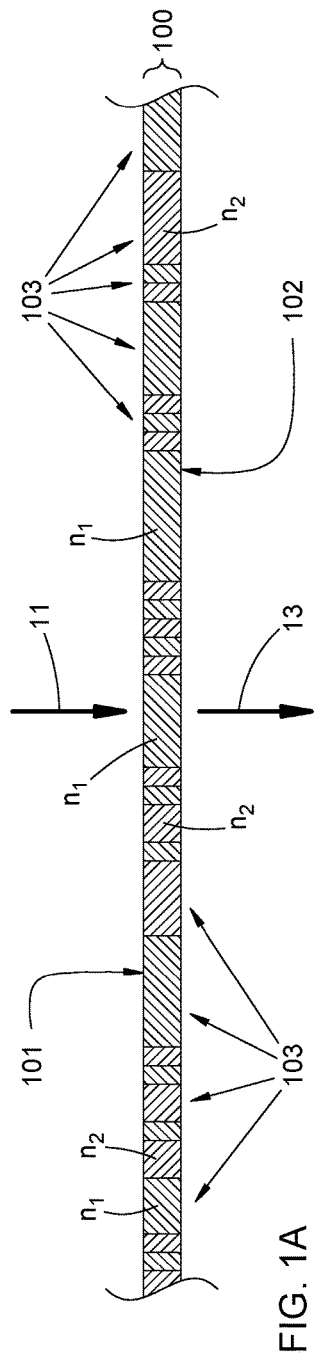
FIGS. 1A and 1B illustrate schematically a transmission layer of example transmissive and reflective optical elements, respectively.

The embodiments depicted are shown only schematically: all features may not be shown in full detail or in proper proportion, certain features or structures may be exaggerated relative to others for clarity, and the drawings should not be regarded as being to scale. For example, the actual transmissive layers depicted as having a handful or dozens of distinct discrete volumes typically can have regions with thousands or millions of discrete volumes per square millimeter; the number of discrete volumes is reduced in the drawings for clarity. In addition, the height, depth, or width of each areal segment often can be exaggerated relative to, e.g., the thickness of an underlying substrate. The embodiments shown are only examples: they should not be construed as limiting the scope of the present disclosure or appended claims.

DETAILED DESCRIPTION OF EMBODIMENTS

Optical elements of various types can be described generally as imposing some desired phase transformation function $\varphi(x,y)$ onto an optical signal propagating through the optical element (where x and y are two-dimensional position coordinates along a surface of the optical element in directions substantially transverse to the propagation direction of the optical signal). In a transmissive optical element, the phase transformation is imparted in a single-pass transmission; in a reflective optical element, the phase transformation is imparted by double-pass transmission with an intervening reflection. Such a phase transformation function may also be referred to herein as a phase shift function, phase delay function, or phase function. Note that it is the relative phase delay across an optical signal wavefront that is relevant, not the absolute phase delay. One example of a phase transformation function is a linear phase transformation function of the form $\varphi(x,y)=Ax+By$, which results in angular deflection of the optical signal without otherwise altering its spatial properties (somewhat analogous to refraction, with the direction of deflection depending on the values of the constants A and B). A second example is a quadratic phase transformation function of the form $\varphi(x,y)=Ax^2+By^2$; $\varphi(x,y)$ written in this form assumes the coordinates x and y are centered with respect to $\varphi(x,y)$ and rotated to coincide with principal axes of $\varphi(x,y)$. A quadratic phase transformation acts as a positive or negative lens in the corresponding transverse dimension according to the signs of the constants A and B. If either A or B (but not both) is zero, then the phase transformation acts as a cylindrical lens (in the paraxial limit). If A=B, the phase transformation acts as a spherical lens (in the paraxial limit). A third example is an angular phase transformation function of the form $\varphi(x,y)=M\theta$ for $0 \leq \theta < 2\pi$, where $\theta$ is related to x and y by $\cos\theta=x/(x^2+y^2)^{1/2}$ and $\sin\theta=y/(x^2+y^2)^{1/2}$ and M is an integer. An angular phase transformation acts as a so-called vortex lens that can be used, e.g., to convert an optical beam with a Gaussian transverse profile into a beam with a doughnut-shaped transverse profile. Phase transformation functions are additive, i.e., a phase transformation function $\varphi(x,y)$ can be a sum of two (or more) distinct, specified, position-dependent phase transformation functions $\varphi_1(x,y)$ and $\varphi_2(x,y)$. In one such example, $\varphi_1(x,y)$ can be a quadratic function and $\varphi_2(x,y)$ can be an angular function; the sum $\varphi(x,y)$ can result in, e.g., focusing of a Gaussian beam while simultaneously converting it to a doughnut-shaped beam, thereby combining the functions of a spherical lens and a vortex lens in a single optical element.

A specified phase transformation function $\varphi(x,y)$ can be imposed by an optical element that imparts a position-dependent phase shift or phase delay onto a transmitted or reflected optical beam. For an optical element comprising a set of one or more optical media, the phase transformation function $\varphi(x,y)$ for a given vacuum wavelength $\lambda$ can be generally expressed (for a transmitted optical signal) as $\varphi(x,y)=(2\pi/\lambda)\cdot\Sigma_i n_i(\lambda)\cdot d_i(x,y)$, where $n_i(\lambda)$ is the refractive index of each optical medium and $d_i(x,y)$ is the local thickness of each optical medium through which the signal propagates. Assuming back-surface reflection for a reflective optical element, $\varphi(x,y)=(4\pi/\lambda)\cdot\Sigma_i n_i(\lambda)\cdot d_i(x,y)$ because the optical signal propagates through the optical media twice. In a singlet refractive lens, a single optical medium is employed and the thickness varies with respect to transverse position. In so-called gradient-index elements (e.g., a GRIN lens), the refractive index varies with transverse position. Certain phase transformation profiles are relatively easy to produce by standard manufacturing techniques. Spherical lenses, for example, provide a quadratic phase transformation (in the paraxial limit) and are easily manufactured; GRIN lenses can be readily manufactured from segments of optical fiber. Other more arbitrary phase transformation functions $\varphi(x,y)$ are not necessarily quite so readily produced. It would be desirable to produce an optical element having an arbitrarily specified phase transformation function $\varphi(x,y)$.

Figure 21:
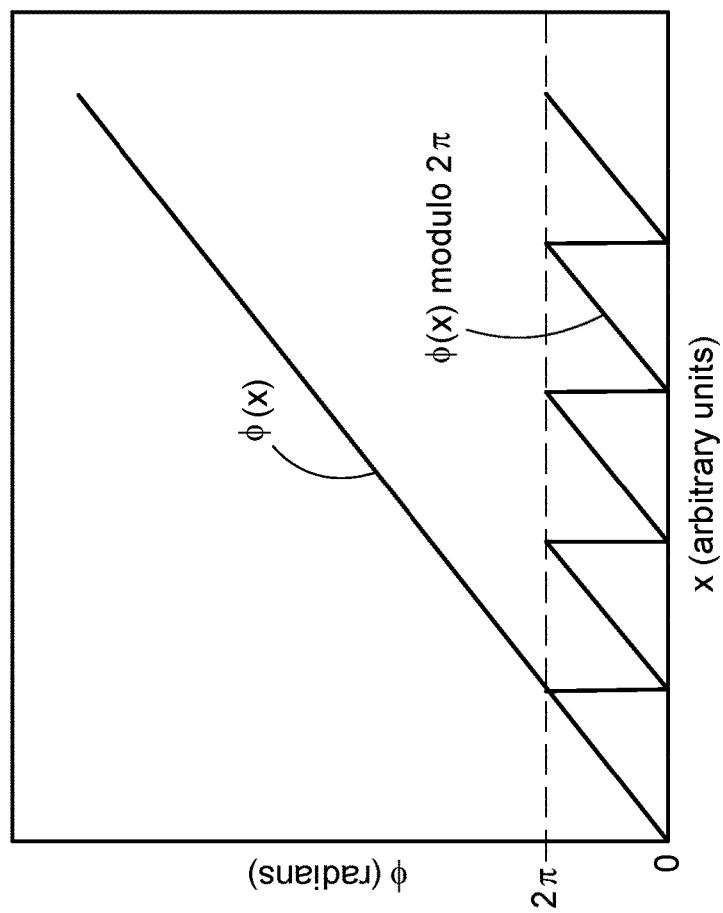
FIGS. 21 and 22 are plots of two example phase functions and their modulo $2\pi$ equivalents.
Figure 22:
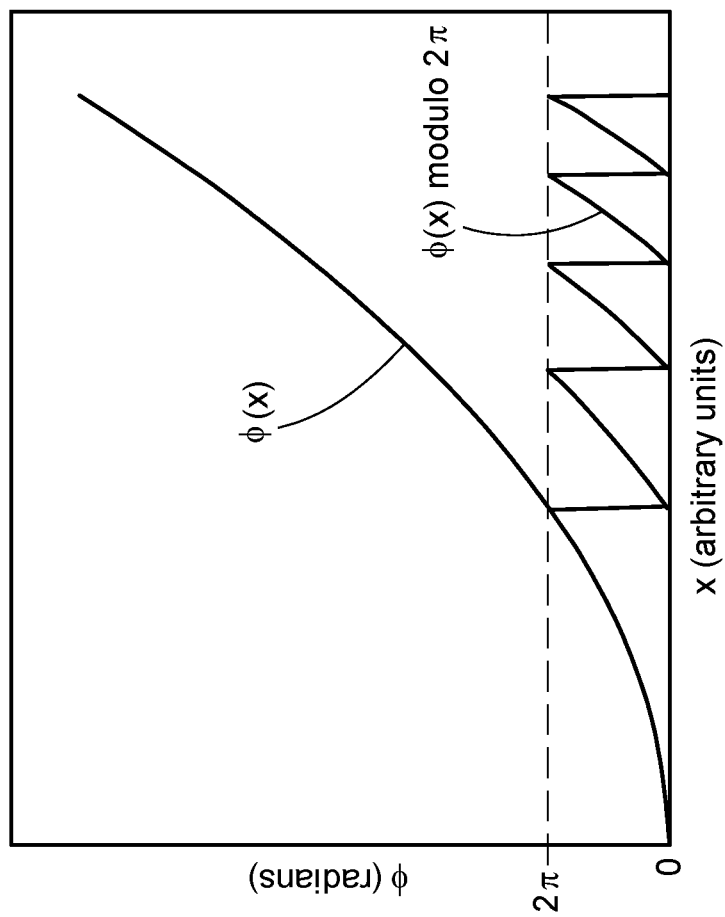

Because of the periodic nature of optical signals, phase delays separated by integer multiples of $2\pi$ all have the same effect on the optical signal. Because of the periodicity, any given phase transformation function can be replaced with an equivalent modulo $2\pi$ function, i.e., each function value can be replaced by the corresponding value from 0 to $2\pi$ that differs from the original value by an integer multiple of $2\pi$. The original phase function and its modulo $2\pi$ equivalent effect the same transformation on an optical signal. Illustrative examples are shown in FIG. 21 (showing a linear phase shift function $\varphi(x)$ and its modulo $2\pi$ equivalent) and FIG. 22 (showing a quadratic phase shift function $\varphi(x)$ and its modulo $2\pi$ equivalent). In addition, phase transformation functions that differ from one another at any given point by an integer multiple of $2\pi$ (and not necessarily the same multiple of $2\pi$ at each point) can be regarded as being equal to one another.

Spatially selective material processing techniques, e.g., photolithography or e-beam lithography, can in principle be employed to produce an optical element that imparts a specified, arbitrary phase transformation function $\varphi(x,y)$. However, most such techniques are best suited for forming a spatial profile having only two levels, (e.g., a given area can be etched or not, photo-exposed or not, doped or not) and so are not so readily employed to provide an arbitrary phase transformation function with a continuous (or near continuous) relative phase distribution. Grayscale or multi-level lithography techniques can produce an optical element that imparts a continuous, arbitrary phase function, but such techniques are far more complex and are difficult to implement at production scales. It would be more desirable to enable use of a two-level lithographic technique (i.e., binary lithography) to produce such optical elements. Inventive optical elements disclosed herein are formed using binary lithographic techniques but nevertheless impart a specified, arbitrary phase transformation function, or at least an operationally acceptable approximation thereof. In the context of the instant specification and appended claims, the phrase operationally acceptable indicates a condition or arrangement that deviates from an ideal condition or arrangement by an amount that still enables the optical device to perform adequately in a given operational context. For example, a conventional singlet lens that deviates from an ideal spherical surface by as much as $\lambda/4$ might be sufficient for some imaging applications, while other imaging applications might require more stringent surface accuracy, e.g., $\lambda/10$ or $\lambda/20$.

Figure 1B:
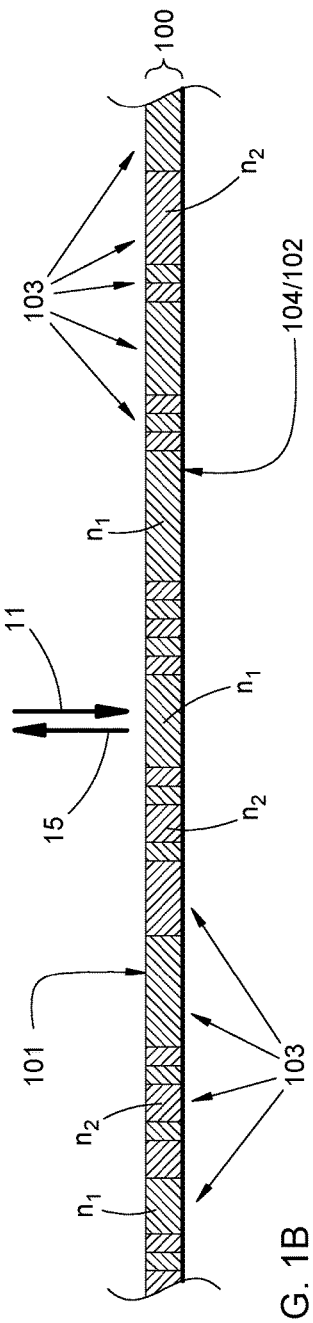

An inventive optical element 10 comprises a transmissive layer 100, illustrated schematically in FIGS. 1A and 1B, that comprises first and second optical media. The first and second optical media are substantially transparent over an operational wavelength range that includes a design vacuum wavelength $\lambda_0$ and are characterized by differing respective first and second wavelength-dependent bulk refractive indices $n_1(\lambda)$ and $n_2(\lambda)$. The first optical medium comprises a substantially solid material (amorphous, crystalline, or polycrystalline), e.g., a doped or undoped dielectric material, a doped or undoped semiconductor material, or a doped or undoped polymer. In some examples, the second optical medium can comprise vacuum, air, one or more inert gases, or other substantially transparent gaseous or liquid material; in other examples, the second optical medium can comprise a solid material, including those examples given above for the first optical medium. The first and second optical media are arranged within the layer 100 as a multitude of discrete, contiguous volumes 103, wherein each volume comprises either the first optical medium or the second optical medium, but not both. A subset of the volumes 103 of the multitude have transverse dimensions (i.e., dimensions parallel to the transmissive layer 100) that are less than about $\lambda_0$ (i.e., a subset of the volumes 103 are sub-wavelength features of the transmissive layer 100). The multitude of discrete volumes 103 is arranged so that any given simply connected (topologically) sample volume of a transmission region of the transmissive layer 100, having both transverse dimensions about equal to $\lambda_0$ along the first surface 101 and extending from the first surface 101 through the transmissive layer 100 to the second surface 102, includes only the first optical medium, only the second optical medium, or both the first and second optical media of at least portions of two or more of the discrete volumes 103. The multitude of discrete volumes 103 is arranged so that any straight-line path, extending substantially perpendicularly from a first surface 101 of the transmissive layer 100 to a second surface 102 of the transmissive layer 101, passes through only the first optical medium, through only the second optical medium, or through only one discrete volume 103 of each of the first and second optical media. Note that for each of the surfaces 101 and 102, in some examples the surface can be a distinct physical interface or boundary between differing structures or materials (e.g., wherein the transmissive layer 100 comprises an etched layer of one material on a substrate of another material, as in the example of FIG. 4), while in other examples the surface can be a virtual boundary between different regions of a single structure or material (e.g., wherein the transmissive layer 100 comprises an etched surface of a substrate, as in the example of FIG. 3).

The discrete volumes 103 are distributed on the transmissive layer 100 so that $(2\pi/\lambda_0)\cdot(n_1(\lambda_0)\cdot d_1(x,y)+n_2(\lambda_0)\cdot d_2(x,y))$, as a function of two-dimensional position coordinates x and y along the first surface of the transmissive layer, averaged over an area having transverse dimensions about equal to $\lambda_0$ on the first surface of the transmissive layer, is substantially equal to a specified position-dependent effective phase transformation function $\varphi_{eff}(x,y)$ for a transmissive optical element (or substantially equal to $\frac{1}{2}\cdot\varphi_{eff}(x,y)$ for a reflective optical element), where (i) $d_1(x,y)$ and $d_2(x,y)$ are the respective local distances through the first and second optical media along the straight-line path through a given position (x,y), and (ii) $\varphi_{eff}(x,y)$ varies with both x and y.

The transmissive layer 100 therefore imparts a local phase delay (at wavelength $\lambda_0$) for single-pass transmission of $(2\pi/\lambda_0)\cdot(n_1(\lambda_0)\cdot d_1(x,y)+n_2(\lambda_0)\cdot d_2(x,y))$ that varies with two-dimensional position (x,y) along the first surface 101 of the transmissive layer 100. In general the thicknesses $d_1(x,y)$ and $d_2(x,y)$ can vary in any suitable way; however, in many examples those thicknesses will be subject to the constraint that the transmissive layer 100 has a substantially uniform thickness $d_1(x,y)+d_2(x,y)=D$ (i.e., substantially uniform to within limits imposed by constraints of fabrication processes employed; see below). Such an arrangement arises naturally when employing a lithographic process on a substrate surface (where D would typically be equal to the etch depth) or on a uniform surface layer on a substrate (where D would typically equal the surface layer thickness). Another common arrangement is one in which the transmissive layer 100 includes areal regions for which either $d_1(x,y)$ or $d_2(x,y)$, but not both, equals zero; in other words, the transmissive layer includes regions wherein only one of the optical media spans the transmissive layer 100 by extending from the first surface 101 through the transmissive layer 100 to the second surface 102. In some examples, all such regions comprise only one of the optical media and no volume of the other optical medium spans the transmissive layer 100; in other examples, some such regions comprise the first optical medium while other such regions comprise the second optical medium; in some of those latter examples, every areal region of the transmissive layer 100 comprises only one or the other optical medium extending from the first surface 101 to the second surface 102 (as in FIGS. 1A/1B and 2 through 10).

Propagation of an optical signal at wavelength $\lambda_0$ through the transmissive layer 100 at given position (x,y) would nominally result in a phase delay of $(2\pi/\lambda_0)\cdot(n_1(\lambda_0)\cdot d_1(x,y)+n_2(\lambda_0)\cdot d_2(x,y))$ for single-pass transmission. However, due to the wave nature of the optical signal having wavelength $\lambda_0$, the optical signal propagating through one of the subwavelength discrete volumes 103 is affected by (i.e., effectively "samples") other nearby discrete volumes 103 (i.e., discrete volumes 103, or portions thereof, within a surrounding region having transverse dimensions about equal to $\lambda_0$), some of which may have index $n_1(\lambda_0)$ and some of which may have index $n_2(\lambda_0)$. The optical signal is affected at position (x,y) as if it were transmitted through a medium having an average index, between $n_1$ and $n_2$, that is about equal to a spatial average of the indices of the nearby discrete volumes 103 or nearby portions thereof. The transmissive layer 100 therefore imparts (in a single pass) a spatially varying effective phase transformation function $\varphi_{eff}(x,y,\lambda_0)$ that is about equal to the quantity $(2\pi/\lambda_0)\cdot(n_1(\lambda_0)\cdot d_1(x,y)+n_2(\lambda_0)\cdot d_2(x,y))$ spatially averaged over a sampling area having transverse dimensions about equal to $\lambda_0$. The discrete volumes 103 can be sized and distributed on the transmissive layer 100 so that $\varphi_{eff}(x,y)$ approximates a specified phase transformation function $\varphi(x,y)$ that varies with both x and y, including those described above. The optical element is structurally arranged so as to receive an optical signal 11 incident on the first surface 101 and to transmit (FIG. 1A; transmitted optical signal 13) or reflect (FIG. 1B; optical signal 15 reflected from reflector 104) at least a portion of the incident optical signal 11 transformed substantially according to the effective phase transformation function $\varphi_{eff}(x,y)$.

Some illustrative examples follow. For $n_1$ of about 1.5 and $n_2$ of unity (e.g., glass or silica and air), the thickness required to effect a $2\pi$ relative phase shift in a single pass is about 1.6 μm for $\lambda_0$ of about 800 nm. For $n_1$ of about 3 and $n_2$ of unity (e.g., a semiconductor and air), the thickness required to effect a $2\pi$ relative phase shift in a single pass is about 0.75 μm at $\lambda_0$ of about 1500 nm. The greater the index contrast between the first and second optical media, the smaller the thickness of the transmissive layer 100 can be while still providing a sufficiently large phase shift.

For conceptualizing and computationally designing the inventive optical element, it can be advantageous for the transmissive layer thickness to result in a phase difference of an integer multiple of $2\pi$ between the first and second optical media. For a transmissive optical element (single pass), the corresponding design constraint is that D is substantially equal to $D_N=N\lambda_0/|n_1(\lambda_0)-n_2(\lambda_0)|$, where N is an integer. For a reflective optical element (double pass), the corresponding design constraint is that D is substantially equal to $D_N=N\lambda_0/(2|n_1(\lambda_0)-n_2(\lambda_0)|)$, where N is an integer. In both cases, the best approximation of the desired phase transformation $\varphi(x,y)$ typically results when N=1 (i.e., when D=Di), which is also the minimum thickness needed to enable any arbitrary phase function to be approximated (i.e., to provide the full range of $2\pi$ phase shift needed to approximate an arbitrary modulo $2\pi$ phase function). If the minimum thickness Di is employed, then the discrete volumes 103 typically must be arranged so that the spatially averaged index of the transmissive layer 100 can achieve the values of $n_1$ and $n_2$ (to provide the full range of $2\pi$ phase shift). Layers of any needed or desired thickness greater than Di can be employed, and must be employed (to provide the full range of $2\pi$ phase shift) in examples wherein fabrication constraints do not permit the discrete volumes 103 to be arranged so that the spatially averaged index of the transmissive layer 100 can reach the values of $n_1$ and $n_2$. The minimum additional thickness needed is determined by limits on fractional areas of each of the optical media imposed by the spatially selective fabrication processes employed.

Figure 2:
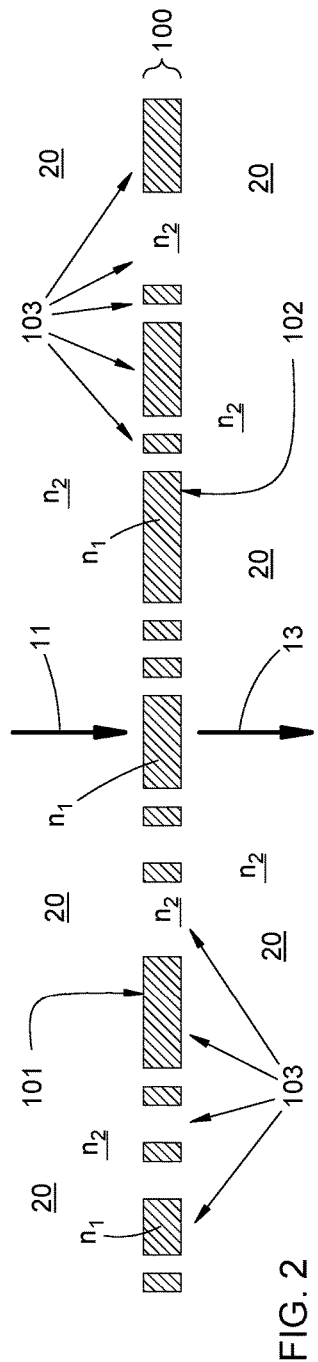
FIG. 2 illustrates schematically a transmission layer of an example transmissive optical element.

The transmissive layer 100 can be physically realized in a number of different arrangements. In perhaps the conceptually simplest example arrangement, the transmissive layer 100 has a substantially uniform thickness D, has a multitude of suitably sized and positioned perforations, and is immersed in an ambient medium that surrounds the layer 100 and fills the perforations (FIG. 2). The solid material of the layer 100 has refractive index $n_1(\lambda)$ and the ambient medium (solid, liquid, or gaseous) has refractive index $n_2(\lambda)$. The perforations and the intervening areas of the layer 100 form the discrete volumes 103, and the perforations can be sized and distributed on the layer 100 to result in the desired effective phase transformation function $\varphi_{eff}(x,y)$. The example of FIG. 2 is suitable for transmission (in a single-pass geometry); one or more additional layers can be employed to form a reflector to reflect the phase-transformed optical signal (in a double-pass geometry). In some examples the ambient medium comprises a gaseous or liquid ambient medium 20, e.g., vacuum, air, one or more inert gases, or an optical fluid. In other examples the ambient medium can be a solid; such an example could be formed, e.g., by immersing the perforated layer 100 in a liquid polymer precursor and then curing the polymer to solidify it. Given the thinness typically required for the transmissive layer 100 (e.g., <1 μm to a few μm), the example of FIG. 2 might be difficult to implement.

In some examples, the transmissive layer 100 is mechanically stabilized by a substrate or overlayer 30 positioned against the surface 101 (the incident surface). The substrate 30 comprises a suitably rigid and stable, substantially transparent, solid material (crystalline, polycrystalline, or amorphous), e.g., a doped or undoped dielectric material, a doped or undoped semiconductor material, or a doped or undoped polymer. The incident optical signal 11 propagates through the substrate 30; the portion 13 of the incident optical signal 11—transmitted through the transmissive layer 100 and into the ambient medium 20—is transformed substantially according to the effective phase transformation function $\varphi_{eff}(x,y)$. In the examples of FIGS. 3, 4, 11, and 12, the transmissive layer 100 comprises surface relief structure on a surface of the substrate 30, the second surface 102 of the transmissive layer 100 is in contact with the gaseous or liquid ambient medium 20, and the ambient medium 20 fills the recessed regions of the surface relief structure, thereby serving as the second optical medium. The recessed regions of the surface relief structure and the intervening non-recessed regions form the discrete volumes 103, and can be sized and distributed on the layer 100 to result in the desired effective phase transformation function $\varphi_{eff}(x,y)$ in a single-pass transmissive geometry. The surface 101 of the layer 100 substantially coincides with the depth D of the recessed regions, while the surface 102 substantially coincides with the un-recessed regions.

Figure 11:
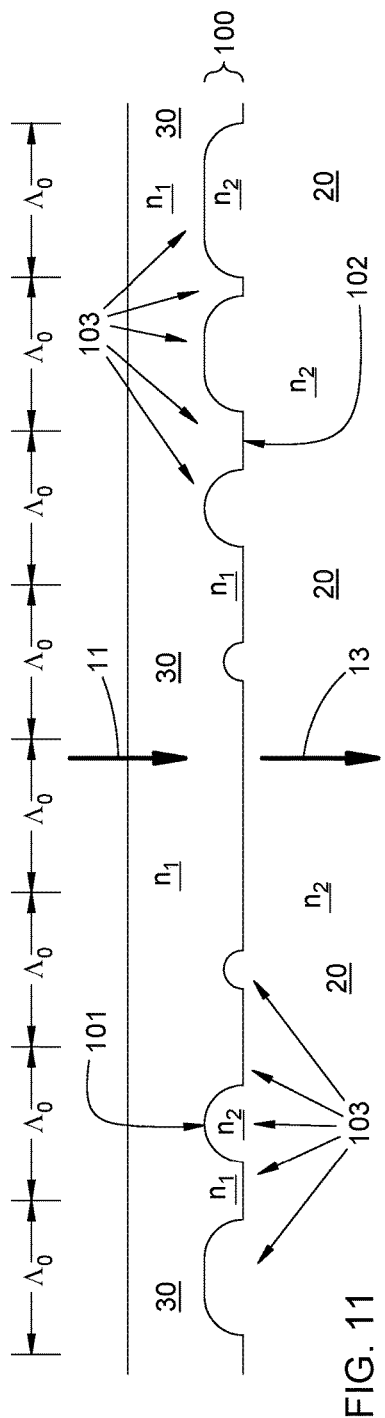
Figure 12:
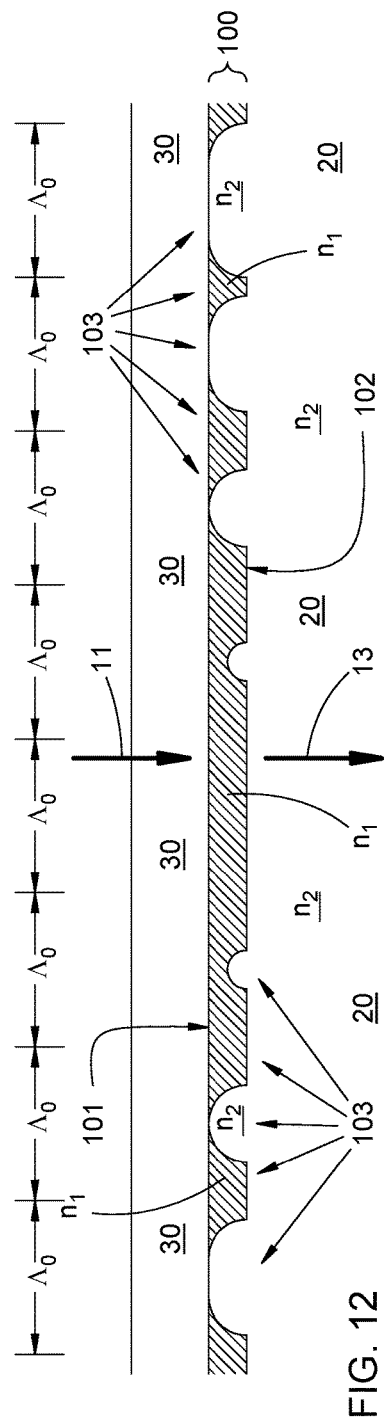

In the examples of FIGS. 3 and 11, the substrate 30 comprises the same material as the first optical medium, and the surface relief structure is formed directly on a surface of the substrate 30. In the examples of FIGS. 4 and 12, the substrate material differs from the first optical medium, and the surface relief structure is formed in a surface layer of the first optical medium that was grown, deposited, or otherwise formed by any suitable process on the substrate 30 of a differing material. Any suitable process can be employed to form the surface relief structure. In some examples, the surface relief structure can be formed by molding, stamping, or embossing the first optical medium. In other examples, the surface relief structure can be replicated in the first optical medium using a master structure. In still other examples, any suitable etch process can be employed, e.g., anisotropic dry etching (FIGS. 3 and 4) or isotropic wet etching (FIGS. 11 and 12) of the photolithographically masked surface or layer of the first optical medium. In some examples in which etching is employed, the etch depth (i.e., the thickness D) is controlled by the time duration of the etch process (other process variables being equal). In some examples in which etching is employed and the first optical medium comprises a surface layer on a substrate 30 of a differing material (FIGS. 4 and 12), it can be advantageous to employ an etch process that etches the first optical medium at a significantly higher rate than the substrate material. In that instance the etch depth D is substantially equal to the thickness of the surface layer, independent of the etch time (if sufficiently long to completely remove unmasked regions of the surface layer, but not so long as to remove photoresist or other patterning or masking layer), and the interface between the first optical medium and the substrate 30 forms the first surface 101 of the transmissive layer 100. If the etch rates do not differ sufficiently, the etch depth can be controlled by the time duration of the etch process (as described above). In some examples (FIGS. 11 and 12), some recessed regions may be etched to a lesser depth than other areas even though etched for the same duration; such an arrangement can be achieved, e.g., using a wet etch process in which smaller unmasked areas might etch at a slower rate due to slower diffusion of etchant to the etched surface. While the transmissive layer 100 in the preceding examples is considered to have a substantially uniform thickness D, the etch process employed can lead to some variation of the etch depth depending on the transverse extent of the localized area being etched (e.g., wider etched regions may tend to etch deeper than narrower etched regions). Notwithstanding such processing variation, such an etched layer shall nevertheless fall within the scope of "substantially uniform thickness."

The examples of FIGS. 5, 6, 13, and 14 are similar to those of FIGS. 3, 4, 11, and 12, respectively, with the addition of a substantially transparent solid overlayer 40 positioned against the second surface 102 of the transmissive layer 100. The overlayer 40 can comprise (i) a solid doped or undoped dielectric material, (ii) a solid doped or undoped semiconductor material, or (iii) a solid doped or undoped polymer. The substantially solid material comprising the overlayer 40 fills the etched regions of the substrate surface (as in FIGS. 5 and 13) or the surface layer (as in FIGS. 6 and 14) and therefore serves as the second optical medium. The overlayer 40 can be formed using any suitable material formed, grown, or deposited in any suitable way, including materials disclosed above. It may be desirable for the opposing surface of the overlayer 40 to be substantially flat. Examples of suitable processes for forming the overlayer 40 can include, e.g., spin deposition of a polymer, beam or vapor deposition of a dielectric material, or other process that enables the second optical medium to substantially fill the recessed regions of the surface relief structure.

The examples of FIGS. 7, 8, 15, and 16 are similar to those of FIGS. 5, 6, 13, and 14, respectively, except that the overlayer 40 comprises a solid material differing from the second optical medium. The overlayer 40 can also comprise material differing from the first optical medium. In some examples the second optical medium can be vacuum, gaseous, or liquid; in other examples, the second optical medium can comprise a solid material grown, deposited, or otherwise formed in the corresponding regions and discrete volumes 103 of the transmissive layer 100, including materials disclosed above. In some examples the overlayer 40 can comprise a substrate positioned against, and perhaps attached or adhered to, the second surface 102 of the transmissive layer 100; in other examples the overlayer 40 can be grown, deposited, or otherwise formed on the second surface 102 of the transmissive layer 100.

Additional examples (not shown) can be implemented that resemble FIG. 7, 8, 15, or 16 but lack the substrate 40. In such examples the second optical medium is a substantially solid material that fills the recessed regions of the surface relief structure. Both the first and second optical media are in contact with an ambient medium into which the transmitted signal 13 propagates.

Any of the examples of FIGS. 3 through 8, FIGS. 11 through 16, and the preceding paragraph can be used in reverse, i.e., the first surface 101 of the transmissive layer 100 faces the ambient medium 20 (FIGS. 3, 4, 11, and 12 and the preceding paragraph) or the overlayer 40 (FIGS. 5-8 and 13-16); the second surface 102 of the transmissive layer 100 faces the substrate 30; the incident optical signal 11 propagates through the ambient medium 20 (FIGS. 3, 4, 11, and 12 and the preceding paragraph) or the overlayer 40 (FIGS. 5-8 and 13-16); and the transformed portion 13 of the signal is transmitted through the transmissive layer 100 and into the substrate 30.

The examples of FIGS. 9, 10, 17, and 18 are similar to those of FIGS. 3, 4, 11, and 12, respectively, except that they include a reflector 104 facing the second surface 102 of the transmissive layer 100. In many examples, the reflector is positioned against the second surface 102 of the transmissive layer 100. The incident optical signal 11 propagates through the substrate 30; the portion 15 of the incident optical signal 11—transmitted through the transmissive layer 100, reflected by the reflector 104, and transmitted back through the transmissive layer 100 and into the substrate 30—is transformed substantially according to the effective phase transformation function $\varphi_{eff}(x,y)$ in a double-pass geometry. The reflector can be of any suitable type, e.g., a metal coating or a dielectric stack. In some examples the second optical medium can be vacuum, gaseous, or liquid; in other examples, the second optical medium can comprise a solid material grown, deposited, or otherwise formed in the corresponding regions and discrete volumes 103 of the transmissive layer 100. In some examples the reflector 104 can be formed on a separate substrate 105 positioned against, and perhaps attached or adhered to, the second surface 102 of the transmissive layer 100 with the reflector between the second surface 102 and the substrate 105; in other examples the reflector 104 can be deposited or otherwise formed on the second surface 102 of the transmissive layer 100, in which case the substrate 105 may not be necessary.

The examples of FIGS. 11-18 are analogous to examples of FIGS. 3-10, respectively, but differ with respect to the cross-sectional shape of the discrete volumes 103. The arrangements of FIGS. 3-10 typically would arise from a directional etch process (e.g., anisotropic reactive ion etching) yielding boundaries between adjacent volumes of the first and second optical media that are vertical or nearly so. The examples of FIGS. 11-18 typically would arise from a non-directional etch process (e.g., isotropic wet etching) yielding boundaries between adjacent volumes of the first and second optical media that are curved. Width and depth of an isotropically etched region vary according to the size of a corresponding opening in the etch mask and can be well characterized and reproducible for a given combination of etched material, etchant, etch time, and etch conditions. FIGS. 3-10 also differ from FIGS. 11-18 with respect to the spatial distribution employed to achieve the desired phase transformation, discussed below.

An inventive method employing an inventive optical element disclosed herein comprises (i) directing an optical signal 11 onto the first surface of the transmissive layer 100 of the optical element and (ii) transmitting through or reflecting from the optical element at least a portion 13 or 15, respectively, of the optical signal transformed substantially according to the specified position-dependent effective phase transformation function $\varphi_{eff}(x,y)$.

An inventive method for making an optical element disclosed herein comprising selectively processing a layer comprising the first optical medium to replace, in selected areas of the layer, the first optical medium with the second optical medium, thereby forming the transmissive layer 100 of the optical element.

The inventive optical elements disclosed herein enable the approximation of an arbitrary phase transformation function $\varphi(x,y)$ in an optical element made using only binary spatial processing techniques. That result is achieved by exploiting the wave nature of the optical signal and its effective "sampling" of multiple sub-wavelength spatial features of the optical element. However, smaller spatial features are increasingly difficult to fabricate with decreasing transverse size. Perhaps more importantly, the transverse feature size limits the corresponding thickness of those features, e.g., a 100 nm linewidth can be readily achieved by spatially selective processing of a 100 nm thick layer of material, but cannot be as readily achieved in a 1 μm thick layer of material. The thickness limitation puts a lower limit on the feature size that can be readily employed, at least in those instances wherein at least a $2\pi$ phase shift is needed or desired to approximate many phase transformation functions and sufficient thickness must be employed to achieve that phase shift.

In some examples (FIGS. 11-18), the transmissive layer 100 has a substantially uniform thickness $d_1(x,y)+d_2(x,y)=D$, and the discrete volumes of the multitude are arranged according to a regular two-dimensional grid pattern, characterized by a grid spacing of $\Lambda_0$, along the first surface of the transmissive layer. The examples of FIGS. 11-18 include discrete volumes 103 typically arising from, e.g., an isotropic wet etch process, however, the grid-based arrangement can be implemented with discrete volumes resembling those of FIGS. 3-10, e.g., those typically arising from a directional dry etch process. The grid spacing $\Lambda_0$ is less than or about equal to $\lambda_0$ and typically greater than about equal to $\lambda_0/20$. In some of those examples, the grid spacing $\Lambda_0$ is greater than about $\lambda_0/10$ or $\lambda_0/4$ or even as large as about $\lambda_0/2$. A smaller grid size can provide a more accurate approximation of the desired phase transformation function, but also requires smaller etched features to implement, which can have a practical lower limit (as discussed above). Any suitable grid pattern can be employed, e.g., triangular, square, rectangular, hexagonal, and so forth. FIGS. 11-18 show only a one-dimensional projection of the grid pattern. Because the discrete volumes 103 and the grid pattern include subwavelength features, typically there may be little or no unwanted coherent scattering or diffraction from the transmissive layer 100.

In some examples, the multitude of discrete volumes 103 is arranged so that, within each unit cell of the grid pattern, the discrete volumes 103 or portions thereof encompassed by that unit cell are arranged according to one of a set of K predetermined unit arrangements, so that $(2\pi/\lambda_0) \cdot (n_1(\lambda_0) \cdot d_1(x,y) + n_2(\lambda_0) \cdot d_2(x,y))$, averaged over each unit cell of the grid pattern, can assume one of K discrete values. An example of a set of unit cell arrangement is illustrated schematically in FIG. 19, which shows ten different unit cells with 0 through 9 etched spots yielding K=10 discrete levels of phase delay. The effective refractive index of each unit cell varies from $n_1(\lambda_0)$ (no etched spots) in discrete steps with each additional etched spot toward $n_2(\lambda_0)$. If the etched spots do not overlap, the discrete effective index steps are nominally linear and stop short of reaching $n_2(\lambda_0)$ due to the areas of the first optical material remaining between the etched spots. If overlapping spots are employed, the effective index can reach $n_2(\lambda_0)$, but the discrete effective index steps may be nonlinear.

In other examples, each one of the discrete volumes 103 is arranged so that, within each unit cell, a single simply connected volume of the first optical medium is surrounded by the second optical medium, or vice versa; some example unit cells are shown in FIG. 20. Each single simply connected volume may or may not extend the full thickness D of the transmissive layer 100; in some examples all such volumes reach both surface 101 and 102, while in other examples some or all such volumes reach only one of the surfaces 101 or 102. The effective index of each unit cell varies according to the size of the surrounded volume relative to the unit cell size. If a set of K discrete sizes are employed for the surrounded volumes, a corresponding set of K discrete effective refractive index steps can be realized; that discrete set can include $n_1(\lambda_0)$ or $n_2(\lambda_0)$ or both if one or more unit cells lack a surrounded volume or if the surrounded volume occupies the entirety of one or more unit cells. If a continuous size range is employed, an effectively continuous effective index range can be achieved. Such a continuous range typically would not include $n_1(\lambda_0)$ or $n_2(\lambda_0)$, due to limitations on the minimum etched feature size imposed by the particular etch process that is employed. Instead of a single surrounded volume, some or all unit cells can contain multiple surrounded volumes.

An example procedure for arranging the discrete volumes 103 to approximate the desired phase function $\varphi(x,y)$ proceeds as follows (assuming a substantially uniform thickness D for the transmissive layer 100 and assuming $n_1 > n_2$). The transmission region of the optical element is divided into a grid with unit cells $\Lambda_0 \times \Lambda_0$ in size. In each unit cell, a local value of the phase shift $\varphi(x,y)$ is calculated by averaging over that $\Lambda_0 \times \Lambda_0$ unit cell. A refractive index needed to achieve that phase shift is calculated based on the thickness D, the wavelength $\lambda_0$, and the indices $n_1(\lambda_0)$ and $n_2(\lambda_0)$. If a set of predetermined unit arrangements is employed, it is determined for each cell which of the predetermined unit arrangements yields an effective index that most closely approximates the calculated refractive index for that cell. If a set of discrete or continuous sizes of a surrounded volume within each unit cell is employed, a size is determined that most closely approximates the calculated refractive index for that cell. After that procedure has been done for every $\Lambda_0 \times \Lambda_0$ unit cell, the resulting two-dimensional spatial pattern is physically realized in any suitable way, e.g., as a photolithography mask, as a master for replication, as a die or mold, and so forth, to achieve the spatially selective replacement of the first optical medium in those selected discrete volumes with the second optical medium.

In another example procedure, wherein each discrete volume 103 is limited to transverse dimensions no smaller than about $\lambda_0/K$, where $2 \leq K \leq 20$, a given area of the transmissive layer 100 having transverse dimensions about equal to $\lambda_0$ would include at most about $K^2$ distinct discrete volumes 103. The desired phase transformation $\varphi(x,y)$ can therefore be approximated at each location by one of $K^2+1$ discrete levels, including $n_1(\lambda_0)$, $n_2(\lambda_0)$, and at least $K^2-1$ intermediate values between $n_1(\lambda_0)$ and $n_2(\lambda_0)$. Higher values of K can yield a more accurate approximation of $\varphi(x,y)$, but require higher-resolution spatially selective processing techniques and may limit the layer thickness and the corresponding maximum achievable phase shift. In many examples, $4 \leq K \leq 10$, i.e., the smallest distinct discrete volumes 103 have transverse dimensions between about $\lambda_0/4$ and about $\lambda_0/10$. In one specific example, $\lambda_0$ is about 1000 nm and K=4, yielding a minimum feature size of about 250 nm and division of any $\lambda_0 \times \lambda_0$ area into at most $K^2=16$ distinct discrete volumes 103. The desired phase transformation $\varphi(x,y)$ can therefore be approximated at each location by one of $K^2+1=17$ discrete levels, including $n_1(\lambda_0)$, $n_2(\lambda_0)$, and at least $K^2-1=15$ intermediate values between $n_1(\lambda_0)$ and $n_2(\lambda_0)$.

An example procedure for arranging the discrete volumes 103 to approximate the desired phase function $\varphi(x,y)$ proceeds as follows (assuming a substantially uniform thickness D for the transmissive layer 100 and assuming $n_1 > n_2$). The transmissive payer 100 is divided into a grid with cells $\lambda_0 \times \lambda_0$ in size. In each cell, a local value of the phase shift $\varphi(x,y)$ is calculated by averaging over that $\lambda_0 \times \lambda_0$ cell. A refractive index needed to achieve that phase shift is calculated based on the thickness D, the wavelength $\lambda_0$, and the indices $n_1(\lambda_0)$ and $n_2(\lambda_0)$. An integer N with $0 \leq N \leq K^2$ is determined for each cell that yields a value of $n_1 + (n_2-n_1) \cdot N/K^2$ that most closely approximates the calculated refractive index for that cell. For each cell, N discrete volumes, each $(\lambda_0/K) \times (\lambda_0/K)$ in size, are chosen for replacement of the first optical medium by the second optical medium. After that procedure has been done for every $\lambda_0 \times \lambda_0$ cell, the resulting two-dimensional spatial pattern is physically realized in any suitable way, e.g., as a photolithography mask, as a master for replication, as a die or mold, and so forth, to achieve the spatially selective replacement of the first optical medium in those selected discrete volumes with the second optical medium.

Figure 23:
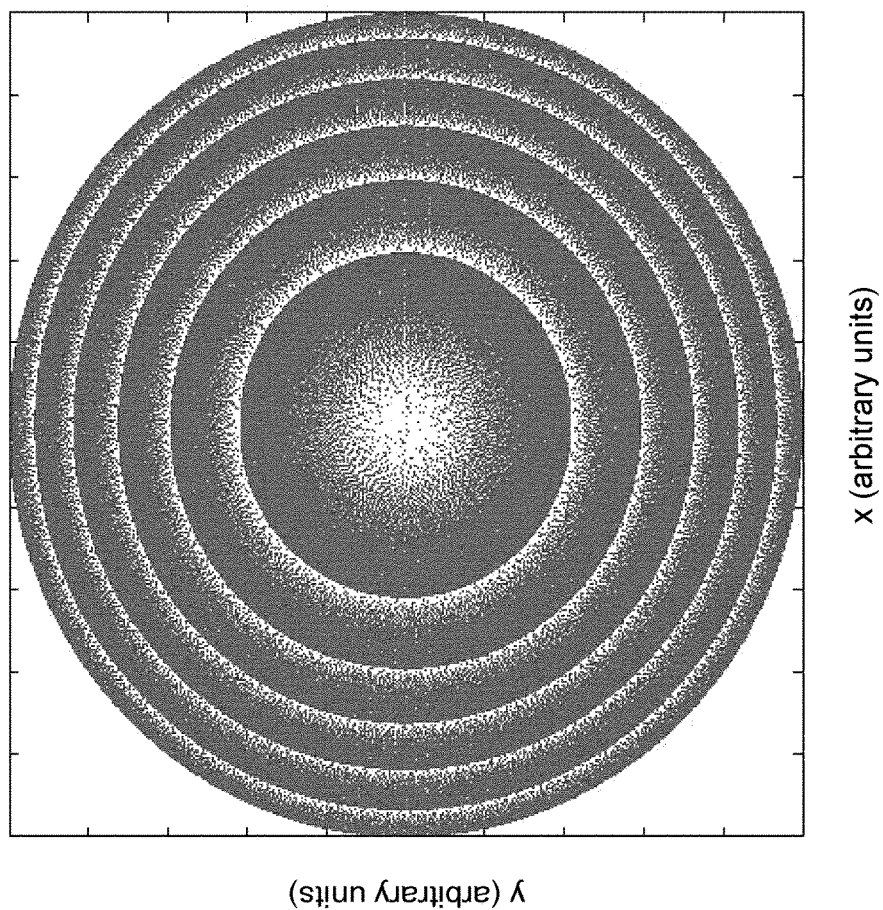
FIGS. 23 and 24 illustrate schematically a density distribution of discrete volume elements of a transmission layer arranged to act as a lens.
Figure 24:
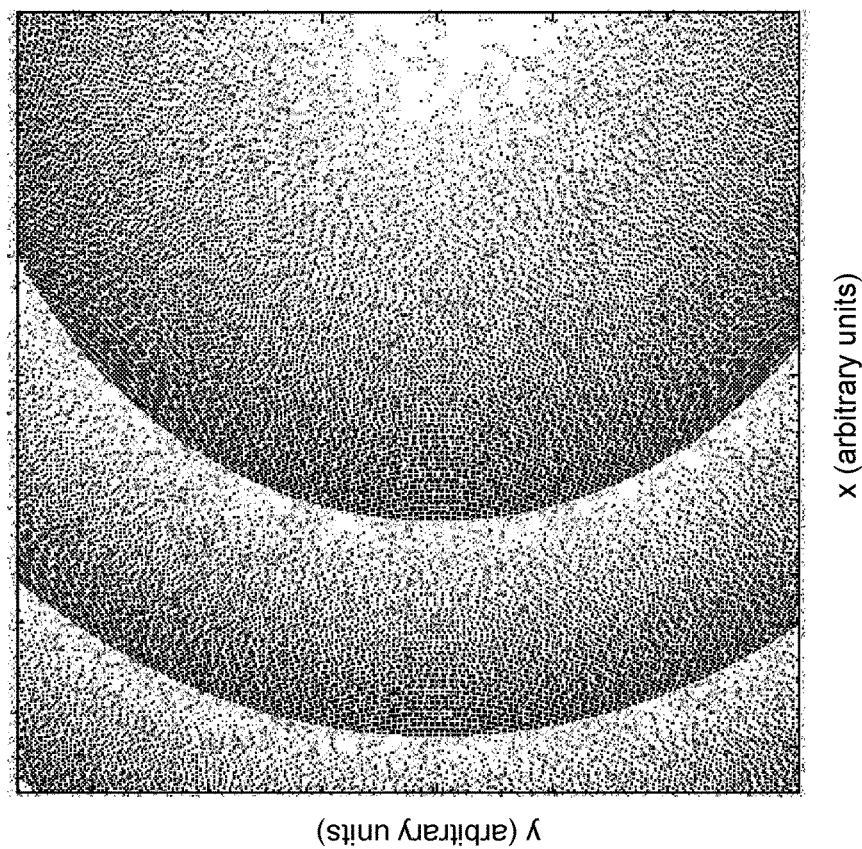

One example is illustrated schematically in FIGS. 23 and 24, in which a higher-index layer (light) is etched in a pattern according to one of the above procedures; the resulting etched regions (dark) have a lower index. The approximated modulo $2\pi$ quadratic phase function illustrated causes the transmissive layer to act as a positive lens.

In the preceding example, it may be desirable for the distinct discrete volumes 103 to be spatially distributed across the transmissive layer 100 in an uncorrelated, irregular, random, or pseudo-random arrangement. Arranging the aerial segments 103 in an uncorrelated, irregular, random, or pseudo-random arrangement can in some instances reduce or substantially eliminate diffraction or coherent scattering of the incident optical signal. For example, a random number generator can be employed to select which N discrete volumes should be processed in each $\lambda_0 \times \lambda_0$ cell. Other algorithms can be employed, including manual manipulation of the spatial pattern In any of the preceding arrangements wherein one or both indices $n_1(\lambda_0)$ or $n_2(\lambda_0)$ are not achieved, a transmissive layer thickness D typically would be employed that is somewhat greater than $\lambda_0/|n_1(\lambda_0)-n_2(\lambda_0)|$ (in a single-pass transmissive geometry; greater than $\lambda_0/(2|n_1(\lambda_0)-n_2(\lambda_0)|)$ for a double-pass reflective geometry) so as to provide a sufficient phase variation of at least $2\pi$ for approximating a desired phase function.

In any of the preceding arrangements, thorough calibration typically is required to characterize the etched feature sizes required to achieve the desired local effective index of the transmissive layer 100. For example, the effective index would be expected to vary roughly according to the relative volumes of the first and second optical media in a given unit cell, but of a given combination of materials, etch process, and geometry might result in deviations from that expectation. Once a calibration is done, the values for the local effective index provided by a given arrangement of discrete volumes can be relied upon for designing and fabricating the inventive etched optical elements.

In addition to the preceding, the following examples fall within the scope of the present disclosure or appended claims:

Example 1

An optical element comprising a transmissive layer comprising first and second optical media, wherein: (a) the first and second optical media are substantially transparent over an operational wavelength range including a design vacuum wavelength $\lambda_0$ and are characterized by differing respective first and second wavelength-dependent bulk refractive indices $n_1(\lambda)$ and $n_2(\lambda)$, and the first optical medium comprises a substantially solid material; (b) the first and second optical media are arranged within the layer as a contiguous multitude of discrete volumes, including a subset of volumes of the multitude having a largest transverse dimension less than about $\lambda_0$, wherein each discrete volume comprises either the first optical medium or the second optical medium, but not both; (c) the contiguous multitude of discrete volumes is arranged so that (i) any given simply connected sample volume of the transmissive layer, said sample volume having transverse dimensions about equal to $\lambda_0$ and extending from the first surface through the transmissive layer to a second surface of the transmissive layer, includes only the first optical medium, only the second optical medium, or both the first and second optical media of at least portions of two or more of the discrete volumes, and (ii) any straight-line path, extending substantially perpendicularly from a first surface of the transmissive layer to a second surface of the transmissive layer, passes through only the first optical medium, through only the second optical medium, or through only one discrete volume of each of the first and second optical media; (d) the discrete volumes of the multitude are distributed on the transmissive layer so that $(2\pi/\lambda_0) \cdot (n_1(\lambda_0) \cdot d_1(x,y) + n_2(\lambda_0) \cdot d_2(x,y))$, as a function of two-dimensional position coordinates x and y along the first surface of the transmissive layer, averaged over a sampling area having a largest transverse dimension about equal to $\lambda_0$ along the first surface of the transmissive layer, is substantially equal to a specified position-dependent effective phase transformation function $\varphi_{eff}(x,y)$, or substantially equal to $\frac{1}{2} \cdot \varphi_{eff}(x,y)$, where (i) $d_1(x,y)$ and $d_2(x,y)$ are the respective local distances through the first and second optical media along the straight-line path through a given position (x,y), and (ii) $\varphi_{eff}(x,y)$ varies with both x and y; and (e) the optical element is structurally arranged so as to receive an optical signal incident on the first surface within the transmission region and to transmit or reflect at least a portion of the incident optical signal transformed substantially according to the effective phase transformation function $\varphi_{eff}(x,y)$.

Example 2

The optical element of Example 1 wherein the transmissive layer includes areal regions for which either $d_1(x,y)$ or $d_2(x,y)$, but not both, are substantially equal to zero.

Example 3

The optical element of Example 2 wherein the transmissive layer includes (i) areal regions for which $d_1(x,y) \neq 0$ and $d_2(x,y)=0$, and (ii) areal regions for which $d_1(x,y)=0$ and $d_2(x,y) \neq 0$.

Example 4

The optical element of Example 2 wherein, at any given position (x,y), either $d_1(x,y)$ or $d_2(x,y)$, but not both, are substantially equal to zero.

Example 5

The optical element of any one of Examples 1 through 4 wherein the transmissive layer has a substantially uniform thickness $d_1(x,y)+d_2(x,y)=D$.

Example 6

The optical element of any one of Examples 1 through 5 wherein the second optical medium comprises a substantially solid material.

Example 7

The optical element of any one of Examples 1 through 5 wherein the second optical medium comprises vacuum, a gaseous material, or a liquid material.

Example 8

The optical element of any one of Examples 1 through 7 wherein the first or second optical medium comprises: (i) a solid doped or undoped dielectric material, (ii) a solid doped or undoped semiconductor material, or (iii) a solid doped or undoped polymer.

Example 9

The optical element of any one of Examples 1 through 8 further comprising a solid substrate or overlayer positioned against the first surface of the transmissive layer, wherein the substrate or overlayer against the first surface is substantially transparent over the operational wavelength range.

Example 10

The optical element of Example 9 wherein the transmissive layer comprises a surface relief structure on a surface of the substrate against the first surface with the second optical medium substantially filling recessed regions of the surface relief structure.

Example 11

The optical element of Example 10 wherein the substrate against the first surface comprises the same material as the first optical medium, and the surface relief structure is formed on a surface of the substrate.

Example 12

The optical element of Example 10 wherein the substrate against the first surface comprises material differing from the first and second optical media, and the surface relief structure is formed in a surface layer of the first optical medium on the substrate.

Example 13

The optical medium of any one of Examples 1 through 12 wherein the substrate or overlayer against the first surface comprises the same material as the first or second optical medium.

Example 14

The optical medium of any one of Examples 1 through 12 wherein the substrate or overlayer against the first surface comprises material differing from the first and second optical media.

Example 15

The optical element of any one of Examples 1 through 14 wherein the substrate or overlayer against the first surface comprises: (i) a solid doped or undoped dielectric material, (ii) a solid doped or undoped semiconductor material, or (iii) a solid doped or undoped polymer.

Example 16

The optical element of any one of Examples 1 through 15 wherein the discrete volumes of the multitude are distributed on the transmissive layer so that $(2\pi/\lambda_0)\cdot(n_1(\lambda_0)\cdot d_1(x,y)+n_2(\lambda_0)\cdot d_2(x,y))$, averaged over a sampling area having a largest transverse dimension about equal to $\lambda_0$ on the first surface of the transmissive layer, is substantially equal to the effective phase transformation function $\varphi_{eff}(x,y)$, and the optical element is structurally arranged so as to receive the optical signal incident on the first surface within the transmission region and to transmit through the second surface at least a portion of the incident optical signal transformed substantially according to the effective phase transformation function $\varphi_{eff}(x,y)$.

Example 17

The optical element of Example 16 wherein the transmissive layer has a substantially uniform thickness $d_1(x,y)+d_2(x,y)=D$ that is substantially equal to $N\lambda_0/|n_1(\lambda_0)-n_2(\lambda_0)|$, where N is an integer.

Example 18

The optical element of Example 17 wherein N=1.

Example 19

The optical element of any one of Examples 16 through 18 further comprising a solid substrate or overlayer positioned against the second surface of the transmissive layer, wherein the substrate or overlayer against the second surface is substantially transparent over the operational wavelength range.

Example 20

The optical element of Example 19 wherein the transmissive layer comprises a surface relief structure on a surface of the substrate against the second surface with the second optical medium substantially filling recessed regions of the surface relief structure.

Example 21

The optical element of Example 20 wherein the substrate against the second surface comprises material differing from the first and second optical media, and the surface relief structure is formed in a surface layer of the first optical medium on the substrate.

Example 22

The optical element of Examples 20 wherein the substrate against the second surface comprises the same material as the first optical medium, and the surface relief structure is formed on a surface of the substrate.

Example 23

The optical medium of any one of Examples 19 through 22 wherein the substrate or overlayer against the second surface comprises the same material as the first or second optical medium.

Example 24

The optical medium of any one of Examples 19 through 22 wherein the substrate or overlayer against the second surface comprises material differing from the first and second optical media.

Example 25

The optical element of any one of Examples 19 through 24 wherein the substrate or overlayer against the second surface comprises: (i) a solid doped or undoped dielectric material, (ii) a solid doped or undoped semiconductor material, or (iii) a solid doped or undoped polymer.

Example 26

The optical element of any one of Examples 1 through 15 further comprising a reflector facing the second surface of the transmissive layer, wherein the discrete volumes of the multitude are distributed on the transmissive layer so that $(4\pi/\lambda_0)\cdot(n_1(\lambda_0)\cdot d_1(x,y)+n_2(\lambda_0)\cdot d_2(x,y))$, averaged over a sampling area having a largest transverse dimension about equal to $\lambda_0$ on the first surface of the transmissive layer, is substantially equal to the effective phase transformation function $\varphi_{eff}(x,y)$, and the optical element is structurally arranged so as to receive the optical signal incident on the first surface within the transmission region and to reflect at least a portion of the incident optical signal transformed substantially according to the effective phase transformation function $\varphi_{eff}(x,y)$.

Example 27

The optical element of Example 26 wherein the transmissive layer has a substantially uniform thickness $d_1(x,y)+d_2(x,y)=D$ that is substantially equal to $N\lambda_0/(2|n_1(\lambda_0)-n_2(\lambda_0)|)$, where N is an integer.

Example 28

The optical element of Example 27 wherein N=1.

Example 29

The optical element of any one of Examples 26 through 28 wherein the reflector is positioned against the second surface of the transmissive layer.

Example 30

The optical element of any one of Examples 26 through 29 further comprising a substrate positioned against the reflector with the reflector positioned between the substrate and the second surface of the transmissive layer.

Example 31

The optical element of any one of Examples 1 through 30 wherein the position-dependent effective phase transformation function $\varphi_{\mathit{eff}}(x,y)$ is a modulo $2\pi$ function.

Example 32

The optical element of any one of Examples 1 through 31 wherein the effective phase transformation function $\varphi_{\mathit{eff}}(x,y)$ approximates a function of the form $\varphi(x,y)=Ax^2+By^2$, or $\varphi(x,y)=Ax^2+By^2$ modulo $2\pi$, where A and B are non-zero, positive or negative real numbers.

Example 33

The optical element of Example 32 wherein $A=B$.

Example 34

The optical element of any one of Examples 1 through 31 wherein the effective phase transformation function $\varphi_{\mathit{eff}}(x,y)$ approximates a function of the form $\varphi(\theta)=M\theta$, or $\varphi(\theta)=M\theta$ modulo $2\pi$, for $0\le\theta<2\pi$, where $\theta$ is related to x and y by $\cos\theta=x/(x^2+y^2)^{1/2}$ and $\sin\theta=y/(x^2+y^2)^{1/2}$ and M is a non-zero integer.

Example 35

The optical element of Example 34 wherein $M=\pm1$.

Example 36

The optical element of any one of Examples 1 through 31 wherein the effective phase transformation function $\varphi_{\mathit{eff}}(x,y)$ approximates a sum, or a modulo $2\pi$ sum, of distinct, specified, position-dependent phase transformation functions $\varphi_1(x,y)$ and $\varphi_2(x,y)$.

Example 37

The optical element of Example 36 wherein (i) $\varphi_1(x,y)=Ax^2+By^2$, or $\varphi_1(x,y)=Ax^2+By^2$ modulo $2\pi$, where A and B are non-zero, positive or negative real numbers, and (ii) $\varphi_2(x,y)=M\theta$, or $\varphi(\theta)=M\theta$ modulo $2\pi$, for $0\le\theta<2\pi$, where $\theta$ is related to x and y by $\cos\theta=x/(x^2+y^2)^{1/2}$ and $\sin\theta=y/(x^2+y^2)^{1/2}$ and M is a non-zero integer.

Example 38

The optical element of any one of Examples 1 through 37 wherein each discrete volume of the multitude has a smallest transverse dimension no smaller than about $\lambda_0/K$, where $2\le K\le 20$.

Example 39

The optical element of Example 38 wherein (i) the transmissive layer has a substantially uniform thickness D, (ii) at any given position (x,y), either $d_1(x,y)=D$ and $d_2(x,y)=0$, or $d_1(x,y)=0$ and $d_2(x,y)=D$, and $(2\pi/\lambda_0)\cdot(n_1(\lambda_0)\cdot d_1(x,y)+n_2(\lambda_0)\cdot d_2(x,y))$, averaged over a sampling area having a largest transverse dimension about equal to $\lambda_0$ along the first surface of the transmissive layer, can assume one of at least $K^2+1$ discrete values including $2\pi\cdot n_1(\lambda_0)\cdot D/\lambda_0$, $2\pi\cdot n_2(\lambda_0)\cdot D/\lambda_0$, and at least $K^2-1$ intermediate values therebetween.

Example 40

The optical element of any one of Examples 38 or 39 wherein $4\le K\le 10$.

Example 41

The optical element of any one of Examples 1 through 40 wherein the discrete volumes are spatially distributed across the transmission region of the transmissive layer in an uncorrelated, irregular, random, or pseudo-random arrangement.

Example 42

The optical element of any one of Examples 1 through 37 wherein (i) the transmissive layer has a substantially uniform thickness $d_1(x,y)+d_2(x,y)=D$, and (ii) the discrete volumes of the multitude are arranged according to a regular two-dimensional grid pattern along the first surface of the transmissive layer characterized by a grid spacing of $\Lambda_0$ between about $\lambda_0/20$ and about $\lambda_0$.

Example 43

The optical element of Example 42 wherein the grid spacing of $\Lambda_0$ is between about $\lambda_0/10$ and about $\lambda_0/2$.

Example 44

The optical element of any one of Examples 42 or 43 wherein the multitude of discrete volumes is arranged so that, within each unit cell of the grid pattern, the discrete volumes or portions thereof encompassed by that unit cell are arranged according to one of a set of K predetermined unit arrangements, so that $(2\pi/\lambda_0)\cdot(n_1(\lambda_0)\cdot d_1(x,y)+n_2(\lambda_0)\cdot d_2(x,y))$, averaged over each unit cell of the grid pattern, can assume one of K discrete values.

Example 45

The optical element of Example 44 wherein the K discrete values include $2\pi\cdot n_1(\lambda_0)\cdot D/\lambda_0$, $2\pi\cdot n_2(\lambda_0)\cdot D/\lambda_0$, and K-2 intermediate values therebetween.

Example 46

The optical element of any one of Examples 42 or 43 wherein the multitude of discrete volumes is arranged so that (i) the discrete volumes or portions thereof encompassed by each unit cell of the grid pattern are arranged as a single simply connected volume of the first optical medium surrounded by the second optical medium and one or both of the first and second surfaces or (ii) the discrete volumes or portions thereof encompassed by each unit cell of the grid pattern are arranged as a single simply connected volume of the second optical medium surrounded by the first optical medium and one or both of the first and second surfaces, so that $(2\pi/\lambda_0)\cdot(n_1(\lambda_0)\cdot d_1(x,y)+n_2(\lambda_0)\cdot d_2(x,y))$, averaged over each unit cell of the grid pattern, can assume a substantially continuous range of values according to a size of each unit cell occupied by the corresponding simply connected volume.

Example 47

The optical element of Example 46 wherein the substantially continuous range of values extends from about $2\pi \cdot n_1(\lambda_0) \cdot D/\lambda_0$ to about $2\pi \cdot n_2(\lambda_0) \cdot D/\lambda_0$.

Example 48

A method employing the optical element of any one of Examples 1 through 47, the method comprising (i) directing an optical signal onto the first surface of the transmissive layer of the optical element and (ii) transmitting through or reflecting from the optical element at least a portion of the optical signal transformed substantially according to the effective phase transformation function $\varphi_{eff}(x,y)$.

Example 49

A method for making the optical element of any one of Examples 1 through 47, the method comprising spatially selectively processing a layer comprising the first optical medium to replace, in selected volumes of the layer, the first optical medium with the second optical medium, thereby forming the transmissive layer of the optical element.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An optical element comprising a transmissive layer comprising first and second optical media, wherein:
   (a) the first and second optical media are substantially transparent over an operational wavelength range including a design vacuum wavelength $\lambda_0$ and are characterized by differing respective first and second wavelength-dependent bulk refractive indices $n_1(\lambda)$ and $n_2(\lambda)$, and the first optical medium comprises a substantially solid material;
   (b) the first and second optical media are arranged within the layer as a contiguous multitude of discrete volumes, including a non-empty subset of volumes of the multitude having a largest transverse dimension less than about $\lambda_0$, wherein each discrete volume comprises either the first optical medium or the second optical medium, but not both;
   (c) the optical element is structurally arranged so as to receive an optical signal, within the operational wavelength range, incident on a first surface of the transmissive layer within the transmission region and to transmit or reflect at least a portion of the incident optical signal transformed substantially according to a specified effective phase transformation function $\varphi_{eff}(x,y)$ that varies as a function of two-dimensional position coordinates x and y along the first surface;
   (d) the discrete volumes of the multitude are variously sized and distributed on the transmissive layer so as to impart on the transmitted or reflected portion of the incident optical signal the effective phase transformation $\varphi_{eff}(x,y)$;
   (e) the multitude of discrete volumes includes (i) multiple discrete volumes of the first optical medium that each extend entirely through the transmissive layer, (ii) multiple discrete volumes of the second optical medium that each extend entirely through the transmissive layer, (iii) multiple discrete volumes of the first optical medium that each extend only partly through the transmissive layer, and (iv) multiple discrete volumes of the second optical medium that each extend only partly through the transmissive layer;

(f) the contiguous multitude of discrete volumes is arranged so that: (i) any locally perpendicular straight-line path, extending from the first surface of the transmissive layer to a second surface of the transmissive layer, passes through only the first optical medium, through only the second optical medium, or through only one discrete volume of each of the first and second optical media; (ii) the discrete volumes of the multitude are distributed on the transmissive layer according to local thicknesses $d_1(x,y)$ and $d_2(x,y)$ through the first and second optical media, respectively, along the locally perpendicular straight-line path through a given position $(x,y)$; and (iii) the transmissive layer includes areal regions for which $d_1(x,y) \neq 0$ and $d_2(x,y)=0$, areal regions for which $d_1(x,y)=0$ and $d_2(x,y) \neq 0$, and areal regions for which $d_1(x,y) \neq 0$ and $d_2(x,y) \neq 0$; and (g) one or both transverse dimensions of each areal region that corresponds to a discrete volume of the second optical medium that extends only partly through the transmissive layer and for which $d_1(x,y) \neq 0$ and $d_2(x,y) \neq 0$ are less than one or both transverse dimensions of each areal region that corresponds to a discrete volume of the second optical medium that extends entirely through the transmissive layer and thereby includes at least a portion thereof for which $d_1(x,y)=0$ and $d_2(x,y) \neq 0$.

2. The optical element of claim 1 wherein the optical element is structurally arranged so as to receive the incident optical signal at substantially normal incidence.

3. The optical element of claim 1 further wherein the optical element further comprises a substantially solid substrate arranged so as to support the transmissive layer.

4. The optical element of claim 3 wherein the substrate comprises material differing from the first and second optical media.

5. The optical element of claim 3 wherein the substrate is substantially transparent over the operational wavelength range.

6. The optical element of claim 1 wherein the second optical medium comprises an ambient medium that is (i) vacuum characterized by the bulk refractive index $n_2(\lambda)=1$, or (ii) gaseous or liquid material characterized by the bulk refractive index $n_2(\lambda)$.

7. The optical element of claim 1 wherein the second optical medium comprises substantially solid material characterized by the bulk refractive index $n_2(\lambda)$.

8. The optical element of claim 1 wherein, among the subset of the discrete volumes of the first optical medium that extend only partly through the transmissive layer, local thickness of the first optical medium increases monotonically as a smallest transverse dimension of the corresponding discrete volume of the first optical medium decreases.

9. The optical element of claim 1 wherein the transmissive layer has a substantially uniform thickness $d_1(x,y)+d_2(x,y)=D$.

10. The optical element of claim 1 wherein the contiguous multitude of discrete volumes is arranged so that $(2\pi/\lambda_0) \cdot (n_1(\lambda_0) \cdot d_1(x,y)+n_2(\lambda_0) \cdot d_2(x,y))$, averaged over a sampling area having a largest transverse dimension about equal to $\lambda_0$ along the first surface, is either (i) substantially equal to $\varphi_{eff}(x,y)$ for a transmitting optical element or (ii) substantially equal to $\frac{1}{2} \cdot \varphi_{eff}(x,y)$ for a reflecting optical element.

11. The optical element of claim 1 wherein the transmissive layer has a substantially uniform thickness $d_1(x,y)+d_2(x,y)=D$ that is substantially equal to $N\lambda_0/(2|n_1(\lambda_0)-n_2(\lambda_0)|)$, where N is a non-zero integer.

12. The optical element of claim 11 wherein N=1 or N=2.

13. The optical element of claim 1 further comprising a solid substrate or overlayer positioned against the first surface of the transmissive layer, wherein the substrate or overlayer against the first surface is substantially transparent over the operational wavelength range.

14. The optical element of claim 13 wherein the transmissive layer comprises a surface relief structure on a surface of the substrate or overlayer against the first surface with the second optical medium substantially filling recessed regions of the surface relief structure.

15. The optical element of claim 14 wherein the substrate or overlayer against the first surface comprises material differing from the first and second optical media, and the surface relief structure is formed in a surface layer of the first optical medium on the substrate.

16. The optical element of claim 14 wherein the substrate or overlayer against the first surface comprises the same material as the first optical medium, and the surface relief structure is formed on a surface of the substrate.

17. The optical element of claim 13 wherein the substrate or overlayer against the first surface comprises material differing from the first and second optical media.

18. The optical element of claim 1 wherein:

(c') the optical element is structurally arranged so as to receive the incident optical signal on the first surface within the transmission region and to transmit at least a portion of the incident optical signal transformed substantially according to the effective phase transformation function $\varphi_{eff}(x,y)$; and (d') the discrete volumes of the multitude are variously sized and distributed on the transmissive layer so as to impart on the transmitted portion of the incident optical signal the effective phase transformation $\varphi_{eff}(x,y)$.

19. The optical element of claim 18 further comprising a solid substrate or overlayer positioned against the second surface of the transmissive layer, wherein the substrate or overlayer against the second surface is substantially transparent over the operational wavelength range.

20. The optical element of claim 19 wherein the transmissive layer comprises a surface relief structure on a surface of the substrate or overlayer against the second surface with the second optical medium substantially filling recessed regions of the surface relief structure.

21. The optical element of claim 20 wherein the substrate or overlayer against the second surface comprises material differing from the first and second optical media, and the surface relief structure is formed in a surface layer of the first optical medium on the substrate or overlayer.

22. The optical element of claim 20 wherein the substrate or overlayer against the second surface comprises the same material as the first optical medium, and the surface relief structure is formed on a surface of the substrate or overlayer.

23. The optical element of claim 19 wherein the substrate or overlayer against the second surface comprises material differing from the first and second optical media.

24. The optical element of claim 1 further comprising a reflector facing the second surface of the transmissive layer, wherein:

(c') the optical element is structurally arranged so as to receive the incident optical signal on the first surface within the transmission region and to reflect at least a portion of the incident optical signal transformed substantially according to the effective phase transformation function $\varphi_{\it eff}(x,y)$; and (d') the discrete volumes of the multitude are variously sized and distributed on the transmissive layer so as to impart on the reflected portion of the incident optical signal the effective phase transformation $\varphi_{\it eff}(x,y)$.

25. The optical element of claim 24 wherein the reflector is positioned against the second surface of the transmissive layer.

26. The optical element of claim 24 further comprising a substrate positioned against the reflector with the reflector positioned between the substrate and the second surface of the transmissive layer.

27. The optical element of claim 24 wherein the optical element further comprises a substantially solid overlayer that is substantially transparent over the operational wavelength range, and the transmissive layer is positioned between the reflector and the overlayer.

28. The optical element of claim 27 wherein the overlayer comprises material different from the first and second optical media.

29. The optical element of claim 1 wherein $\varphi_{\it eff}(x,y)$ varies with both x and y.

30. The optical element of claim 1 wherein the position-dependent effective phase transformation function $\varphi_{\it eff}(x,y)$ is a modulo $2\pi$ function.

31. The optical element of claim 1 wherein the effective phase transformation function $\varphi_{\it eff}(x,y)$ approximates a function of the form $\varphi(x,y)=Ax^2+By^2$, or $\varphi(x,y)=Ax^2+By^2$ modulo $2\pi$, where A and B are non-zero, positive or negative real numbers.

32. The optical element of claim 1 wherein the effective phase transformation function $\varphi_{\it eff}(x,y)$ approximates a function of the form $\varphi(\theta)=M\theta$, or $\varphi(\theta)=M\theta$ modulo $2\eta$, for $0\leq\theta<2\pi$, where $\theta$ is related to x and y by $\cos\theta=x/(x^2+y^2)^{1/2}$ and $\sin\theta=y/(x^2+y^2)^{1/2}$ and M is a non-zero integer.

33. The optical element of claim 1 wherein the effective phase transformation function $\varphi_{\it eff}(x,y)$ approximates a sum, or a modulo $2\pi$ sum, of distinct, specified, position-dependent phase transformation functions $\varphi_1(x,y)$ and $\varphi_2(x,y)$.

34. The optical element of claim 33 wherein (i) $\varphi_1(x,y)=Ax^2+By^2$, or $\varphi_1(x,y)=Ax^2+By^2$ modulo $2\pi$, where A and B are non-zero, positive or negative real numbers, and (ii) $\varphi_2(x,y)=M\theta$, or $\varphi_2(\theta)=M\theta$ modulo $2\pi$, for $0\leq\theta<2\pi$, where $\theta$ is related to x and y by $\cos\theta=x/(x^2+y^2)^{1/2}$ and $\sin\theta=y/(x^2+y^2)^{1/2}$ and M is a non-zero integer.

35. The optical element of claim 1 wherein each discrete volume of the multitude has a smallest transverse dimension no smaller than about $\lambda_0/K$, where $2\leq K\leq 20$.

36. The optical element of claim 35 wherein (i) the transmissive layer has a substantially uniform thickness D, (ii) at any given position (x,y), either $d_1(x,y)=D$ and $d_2(x,y)=0$, $d_1(x,y)=0$ and $d_2(x,y)=D$, or $d_1(x,y)+d_2(x,y)=D$ with $d_1(x,y)\neq 0$ and $d_2(x,y)\neq 0$, where $d_1(x,y)$ and $d_2(x,y)$ are local thicknesses through the first and second optical media, respectively, along a locally perpendicular straight-line path through the transmissive layer at a given position (x,y), and (iii) $(2\pi/\lambda_0)\cdot(n_1(\lambda_0)\cdot d_1(x,y)+n_2(\lambda_0)\cdot d_2(x,y))$, averaged over a sampling area having transverse dimensions about equal to $\lambda_0$ by $\lambda_0$ along the first surface of the transmissive layer, can assume one of at least $K^2+1$ discrete values.

37. The optical element of claim 1 wherein the discrete volumes are spatially distributed across the transmission region of the transmissive layer in an uncorrelated, irregular, random, or pseudo-random arrangement.

38. The optical element of claim 1 wherein (i) the transmissive layer has a substantially uniform thickness D, and (ii) the discrete volumes of the multitude are arranged according to a regular two-dimensional grid pattern along the first surface of the transmissive layer characterized by a grid spacing of $\Lambda_0$ between about $\lambda_0/20$ and about $\lambda_0$.

39. The optical element of claim 38 wherein the multitude of discrete volumes is arranged so that, within each unit cell of the grid pattern, the discrete volumes or portions thereof encompassed by that unit cell are arranged according to one of a set of K predetermined unit arrangements, so that $(2\pi/\lambda_0)\cdot(n_1(\lambda_0)\cdot d_1(x,y)+n_2(\lambda_0)\cdot d_2(x,y))$, averaged over each unit cell of the grid pattern, can assume one of K discrete values, wherein (i) $d_1(x,y)$ and $d_2(x,y)$ are local thicknesses through the first and second optical media, respectively, along a locally perpendicular straight-line path through the transmissive layer at a given position (x,y), (ii) $d_1(x,y)+d_2(x,y)=D$, and (iii) the transmissive layer includes areal regions for which $d_1(x,y)=D$ and $d_2(x,y)=0$, areal regions for which $d_1(x,y)=0$ and $d_2(x,y)=D$, and areal regions for which $d_1(x,y)+d_2(x,y)=D$ with $d_1(x,y)\neq 0$ and $d_2(x,y)\neq 0$.

40. The optical element of claim 38 wherein the multitude of discrete volumes is arranged so that (i) the discrete volumes or portions thereof encompassed by each unit cell of the grid pattern are arranged as a single simply connected volume of the first optical medium surrounded by the second optical medium and one or both of the first and second surfaces or (ii) the discrete volumes or portions thereof encompassed by each unit cell of the grid pattern are arranged as a single simply connected volume of the second optical medium surrounded by the first optical medium and one or both of the first and second surfaces, so that $(2\pi/\lambda_0)\cdot(n_1(\lambda_0)\cdot d_1(x,y)+n_2(\lambda_0)\cdot d_2(x,y))$, averaged over each unit cell of the grid pattern, can assume a substantially continuous range of values according to a size of each unit cell occupied by the corresponding simply connected volume, wherein (1) $d_1(x,y)$ and $d_2(x,y)$ are local thicknesses through the first and second optical media, respectively, along a locally perpendicular straight-line path through the transmissive layer at a given position (x,y), (2) $d_1(x,y)+d_2(x,y)=D$, and (3) the transmissive layer includes one or more areal regions for which $d_1(x,y)=D$ and $d_2(x,y)=0$, one or more areal regions for which $d_1(x,y)=0$ and $d_2(x,y)=D$, and one or more areal regions for which $d_1(x,y)+d_2(x,y)=D$ with $d_1(x,y)\neq 0$ and $d_2(x,y)\neq 0$.

41. A method for using the optical element of claim 1, the method comprising (i) directing an optical signal onto the first surface of the transmissive layer of the optical element and (ii) transmitting through or reflecting from the optical element at least a portion of the incident optical signal transformed substantially according to the effective phase transformation function $\varphi_{\it eff}(x,y)$.

42. A method for making the optical element of claim 1, the method comprising spatially selectively processing a layer comprising the first optical medium to replace, in selected volumes of the layer, the first optical medium with the second optical medium, thereby forming the transmissive layer of the optical element.

43. The method of claim 42 further comprising calibrating an arrangement of the variously sized and distributed discrete volumes of the multitude according to the effective phase transformation $\varphi_{\it eff}(x,y)$.

* * * * *